US012034567B1

(12) United States Patent
Arora et al.

(10) Patent No.: US 12,034,567 B1
(45) Date of Patent: Jul. 9, 2024

(54) INTER-CLUSTER COMMUNICATION

(71) Applicant: NUTANIX, INC., San Jose, CA (US)

(72) Inventors: Aashray Arora, Seattle, WA (US); Aditya Vilas Jaltade, San Jose, CA (US); Rishi Bhardwaj, San Francisco, CA (US)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 18/335,576

(22) Filed: Jun. 15, 2023

(51) Int. Cl.
H04L 12/46 (2006.01)
H04L 67/10 (2022.01)

(52) U.S. Cl.
CPC .............. *H04L 12/46* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,973,053 B1 | 12/2005 | Passman et al. | |
| 8,549,518 B1 | 10/2013 | Aron et al. | |
| 8,601,473 B1 | 12/2013 | Aron et al. | |
| 8,634,330 B2 | 1/2014 | Ganapathy et al. | |
| 8,850,130 B1 | 9/2014 | Aron et al. | |
| 8,863,124 B1 | 10/2014 | Aron | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,736,065 B2 | 8/2017 | Tsai et al. | |
| 9,747,287 B1 | 8/2017 | Bhardwaj et al. | |
| 9,772,866 B1 | 9/2017 | Aron et al. | |
| 11,196,591 B2 | 12/2021 | Hira et al. | |
| 2016/0105323 A1* | 4/2016 | Haeupler | H04L 67/1072 709/224 |
| 2018/0020046 A1* | 1/2018 | Foebel | H04W 40/22 |
| 2018/0062917 A1* | 3/2018 | Chandrashekhar | H04L 49/25 |
| 2019/0342229 A1* | 11/2019 | Khinvasara | H04L 45/04 |
| 2022/0138014 A1* | 5/2022 | Maturi | G06F 11/2035 709/226 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — June Sison
(74) *Attorney, Agent, or Firm* — Artegis Law Group, LLP

(57) ABSTRACT

Various embodiments set forth a computer-readable media storing program instructions that, when executed by one or more processors, cause the processors to perform steps of establishing, by a first node of a first cluster, a respective first connection with each of a plurality of second nodes in a second cluster; and establishing, by third node of the first cluster, a second connection with the first node. The third node is prevented from establishing a connection with any of the second nodes. The steps further include sending, by the third node, a message to the second cluster by sending the message to the first node via the second connection, where the first node is configured to forward the message to one of the second nodes via a corresponding one of the respective first connections.

39 Claims, 14 Drawing Sheets

(56) References Cited

U.S. PATENT DOCUMENTS

2022/0237017 A1  7/2022  Kim

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.
Poitras, Steven. "The Nutanix Bible" (Jun. 20, 2014), from http://stevenpoitras.com/the-nutanix-bible/ (Publication date based on indicated capture date by Archive.org; first publication date unknown); pp. all.
Poitras, Steven. "The Nutanix Bible" (Jan. 7, 2015), from http://stevenpoitras.com/the-nutanix-bible/ (Publication date based on indicated capture date by Archive.org; first publication date unknown); pp. all.
Poitras, Steven. "The Nutanix Bible" (Jun. 9, 2015), from http://stevenpoitras.com/the-nutanix-bible/ (Publication date based on indicated capture date by Archive.org; first publication date unknown); pp. all.
Poitras, Steven. "The Nutanix Bible" (Sep. 4, 2015), from https://nutanixbible.com/; pp. all.
Poitras, Steven. "The Nutanix Bible" (Jan. 12, 2016), from https://nutanixbible.com/ ; pp. all.
Poitras, Steven. "The Nutanix Bible" (Jun. 9, 2016), from https://nutanixbible.com/; pp. all.
Poitras, Steven. "The Nutanix Bible" (Jan. 3, 2017), from https://nutanixbible.com/; pp. all.
Poitras, Steven. "The Nutanix Bible" (Jun. 8, 2017), from https://nutanixbible.com/; pp. all.
Poitras, Steven. "The Nutanix Bible" (Jan. 3, 2018), from https://nutanixbible.com/; pp. all.
Poitras, Steven. "The Nutanix Bible" (Jun. 25, 2018), from https://nutanixbible.com/; pp. all.
Poitras, Steven. "The Nutanix Bible" (Jan. 8, 2019), from https://nutanixbible.com/; pp. all.
Poitras, Steven. "The Nutanix Bible" (Jul. 25, 2019), from https://nutanixbible.com/; pp. all.
Poitras, Steven. "The Nutanix Bible" (Sep. 17, 2019), from https://nutanixbible.com/; pp. all.
Cano, Ignacio et al. "Curator: Self-Managing Storage for Enterprise Clusters"; University of Washington; published Mar. 2017; pp. all.
Poitras, Steven. "The Nutanix Bible" (Mar. 2, 2020), from https://nutanixbible.com/; pp. all.
Poitras, Steven. "The Nutanix Bible" (Sep. 1, 2020), from https://nutanixbible.com/; pp. all.
Ctirix Validated Solutions, "Citrix XenDesktop 7.1 on Microsoft Hyper-V Server 2012 R2 on Nutanix Virtual Computing Platform Solution Design", Prepared by: Citrix Validated Solutions, Jun. 25, 2014.
Poitras, Steven et al., The Nutanix Bible—Classic Edition, Jun. 9, 2023, 255 pages, https://www.nutanixbible.com/pdf/classic.pdf.
"Deployment Models" https://istio.io/latest/docs/ops/deployment/deployment-models/, Jun. 15, 2023, 11 pages.
"Multicloud communication for Kubernetes", https://skupper.io/, Jun. 15, 2023, 1 page.
"Skupper overview", https://skupper.io/docs/overview/index.html, accessed Jun. 15, 2023, 1 page.
"Skupper connectivity", https://skupper.io/docs/overview/connectivity.html, accessed Jun. 15, 2023, 2 pages.
"Skupper routing", https://skupper.io/docs/overview/routing.html, accessed Jun. 15, 2023, 1 page.
Jafarpour, Hojjat et al., "Dynamic Load Balancing for Cluster-based Publish/Subscribe System", Published in: 2009 Ninth Annual International Symposium on Applications and the Internet; Jul. 20-24, 2009, 7 pages.
Rohini, R., et al., "Development of Quality of Service in Wireless Sensor Networks by Mitigating Hidden Node Problem", Published in: 2013 IEEE International Conference on Computational Intelligence and Computing Research Dec. 26-28, 2013, 4 pages.

* cited by examiner

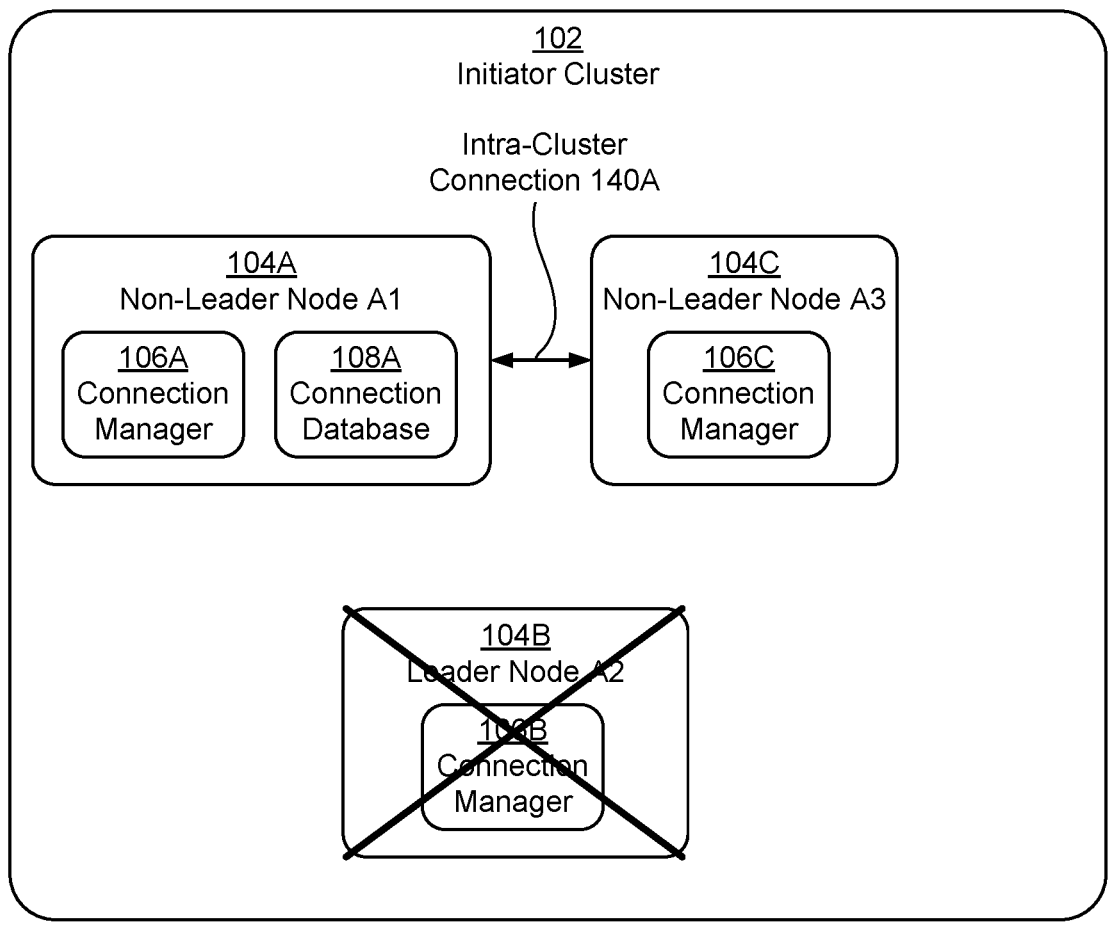
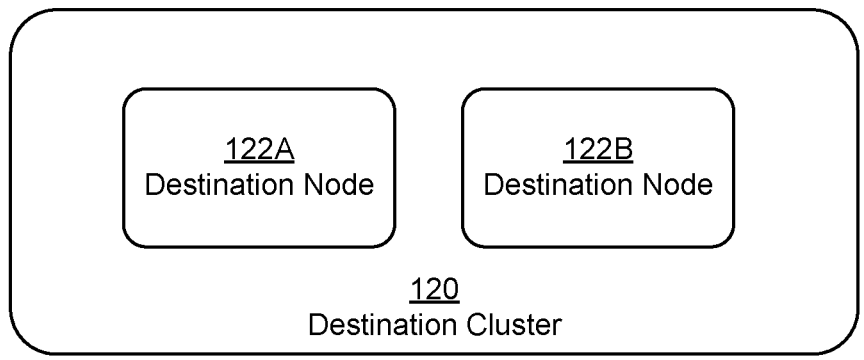
FIG. 1B

200A

| Initiator Node ID 202A | Address(es) to Access Destination Cluster 204A |
|---|---|
| A1 | A2 |
| A2 (Leader) | B1, B2 |
| A3 | A2 |

| Initiator Node ID 202B | Address(es) to Access Destination Cluster 204B |
|---|---|
| A1 (New Leader) | B1, B2 |
| A2 (Down) | (None) |
| A3 | A1 |

| Initiator Node ID 202C | Address(es) to Access Destination Cluster 204C |
|---|---|
| A1 (New Leader) | B1, B2 |
| A2 (Recovered) | A1 |
| A3 | A1 |

Determine that a number of existing leader nodes in an initiator cluster is less than a target number of leader nodes for the initiator cluster
502

---

Elect one or more new leader nodes in the initiator cluster, wherein the number of new leader nodes is determined based on a difference between the target number of leader nodes and the number of existing leader nodes
504

---

For each of the new leader nodes, create one or more inter-cluster network connections, wherein the one or more inter-cluster network connections include, for each respective destination node in a destination cluster, an inter-cluster network connection between the new leader node and the respective destination node
506

---

For each of the inter-cluster network connections, update a connection database of the initiator cluster to include a representation of a connection between the new leader node of the inter-cluster network connection and the destination node of the inter-cluster network connection
508

---

For each of the new leader nodes, create one or more intra-cluster network connections, wherein the one or more intra-cluster network connections include, for each respective non-leader node in the initiator cluster, an intra-cluster network connection between the new leader node and the respective non-leader node
510

---

For each of the intra-cluster network connections, update the connection database of the initiator cluster to include a representation of a connection between the new leader node of the intra-cluster network connection and the destination node of the intra-cluster network connection
512

FIG. 5

| Row 662 | Initiator Node ID 664 | Address(es) to Access Destination Cluster 666 |
|---|---|---|
| 1 | A1 | A2, A4 |
| 2 | A2 (Leader) | B1, B2 |
| 3 | A3 | A2, A4 |
| 4 | A4 (Leader) | B1, B2 |
| 5 | A5 | A2, A4 |

INTER-CLUSTER COMMUNICATION

TECHNICAL FIELD

The contemplated embodiments relate generally to management of resources in a computing system and, more specifically, inter-cluster communication.

BACKGROUND

A cluster computing system is a group of host computers and other resources that communicate with each other via an intra-cluster network. Each host computer is referred to as a "node." A node can provide compute, memory, and persistent storage resources. Computational tasks can be distributed across nodes to improve performance, scalability, and fault-tolerance. Each node can execute, for example, virtual machines, operating systems, applications, or other program code that performs the computational tasks. The intra-cluster network can be a local-area network or other network having a large bandwidth capacity and low latency. A node can send data to or receive data from another node in the cluster via the intra-cluster network.

Distributing tasks across nodes provides high performance because multiple nodes can perform portions of the task concurrently. Nodes can communicate data and results of the computation to other nodes in the same cluster via the intra-cluster network. Nodes of a cluster can communicate with host computers that are not in the cluster via an inter-cluster network. The host computers not in the cluster, such as host computers located outside the cluster, can be nodes of another cluster, for example.

Network communication between nodes often uses a network connection, which is referred to herein as a "connection" for brevity. In connection-oriented network protocols such as the Transmission Control Protocol/Internet Protocol (TCP/IP), a connection is established before data can be sent from one node to another node. A network connection is an entity at a network protocol level, and does not necessarily use a physical connection. Communication between two nodes using connections involves opening a connection between the two nodes, transferring data via the connection, maintaining the open connection, and closing the connection. Maintaining an open connection uses memory resources to store connection state. Each open connection also uses processor and network resources at various times. Timers are maintained for each connection, and callback functions can be invoked when timers expire. For example, a timer can be used to verify that a connection is still "alive" by sending a probe packet to the other node and waiting for a response. Network connections thus use node and network resources for each connection, and the amount of resources used increases as the number of more open connections increases.

Conventionally, an open connection can be maintained between each pair of nodes. A cluster computing system can create a connection from each node of a cluster to each of the other nodes of the cluster. Accordingly, the number of open intra-cluster connections can be large for clusters than have many nodes. Nodes can be configured to maintain these open intra-cluster connections, e.g., by configuring networking parameters appropriately and using nodes that have sufficient processor and memory resources.

One drawback to maintaining an open connection between each pair of nodes is that the number of connections can increase as more nodes open connections between clusters. Over time, as a node in one cluster communicates with each node in the other cluster, the node would establish a connection with each node in the other cluster. As a cluster can have many nodes, this would cause a multiplication of connections, which is a large resource drain on the distributed system and is not scalable. Another drawback is that the number of connections can be limited by the networking infrastructure that provides inter-cluster communication can also impose limitations on the number of inter-cluster connections. For example, if the cluster is implemented using a cloud computing platform, the cloud provider can limit the number of open connections between the cluster and host computers outside the cluster. The limit can prevent more than a threshold number of connections between the cluster and external host computers outside the cluster. The cloud provider can alternatively impose additional costs for opening more than the threshold number of connections between the cluster and the external host computers. These cloud provider limitations can be the result of limitations of infrastructure devices gateways, routers, and/or firewalls that do not have sufficient memory and/or processor resources to maintain a large number of open connections. There can be other factors involved in inter-cloud communication that limit the number of open connections, or cause performance degradation as the number of open connections increases. For example, the inter-cluster network have lower available communication bandwidth than the intra-cluster network, and a sufficiently large number of open connections can reduce the amount of inter-cluster bandwidth available for communication of data.

Accordingly, there is a need for improved techniques for managing connections between a cluster and external host computers, such as nodes of another cluster.

SUMMARY

In various embodiments, one or more non-transitory computer-readable media storing program instructions that, when executed by one or more processors, cause the one or more processors to perform steps of establishing, by a first node of a first cluster, a respective first connection with each of a plurality of second nodes in a second cluster; and establishing, by third node of the first cluster, a second connection with the first node. The third node is prevented from establishing a connection with any of the plurality of second nodes. The steps further comprise sending, by the third node, a message to the second cluster by sending the message to the first node via the second connection. The first node is configured to forward the message to one of the second nodes via a corresponding one of the respective first connections.

Other embodiments include, without limitation, systems and methods that implement one or more aspects of the disclosed techniques.

One technical advantage of the disclosed techniques relative to the prior art is that the number of network connections between clusters is reduced, so fewer resources are used. In the disclosed techniques, the number of inter-cluster network connections initiated by a cluster is based on the number of leader nodes in the cluster. The number of leader nodes can be set to a number that is relatively small compared to the number of connections that would be used if each node of the initiator cluster establishes a connection with each node of the destination cluster, as in prior approaches. In prior approaches, over time, as a node in one cluster communicates with each node in the other cluster, the node would establish a connection with each node in the other cluster. The number of connections in such prior approaches would increase based on the product of the number of connected nodes in the initiator cluster and the number of connected nodes in the destination cluster, where each connected node is connected to a node of another cluster. Opening an inter-cluster connection for each pair of nodes is a large resource drain on the distributed system and is not scalable. The disclosed techniques open an inter-cluster connection for each leader node and so use a substantially smaller number of simultaneous open connections over time than prior approaches. Accordingly, the disclosed techniques use substantially less memory and exhibit greater scalability than prior approaches over time. In addition, the inter-cluster connections established by the leader nodes allow nodes in the other cluster to access computing resources in the cluster of the leader nodes through a firewall that those nodes otherwise are not able to establish a connection through. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 1B illustrates a cluster having a leader node that has failed, according to various embodiments;

FIG. 2A illustrates an example connection table that associates each initiator node in an initiator cluster with addresses other initiator node(s) or destination node(s) to which the initiator node is connected, according to various embodiments;

FIG. 2B illustrates an example connection table subsequent to failure of a leader node, according to various embodiments;

FIG. 2C illustrates an example connection table subsequent to election of a new leader node, according to various embodiments;

FIG. 5 is a flow diagram of method steps for initializing or updating network connections in an initiator cluster, according to various embodiments;

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Inter-Cluster Communication

Figure 1A:
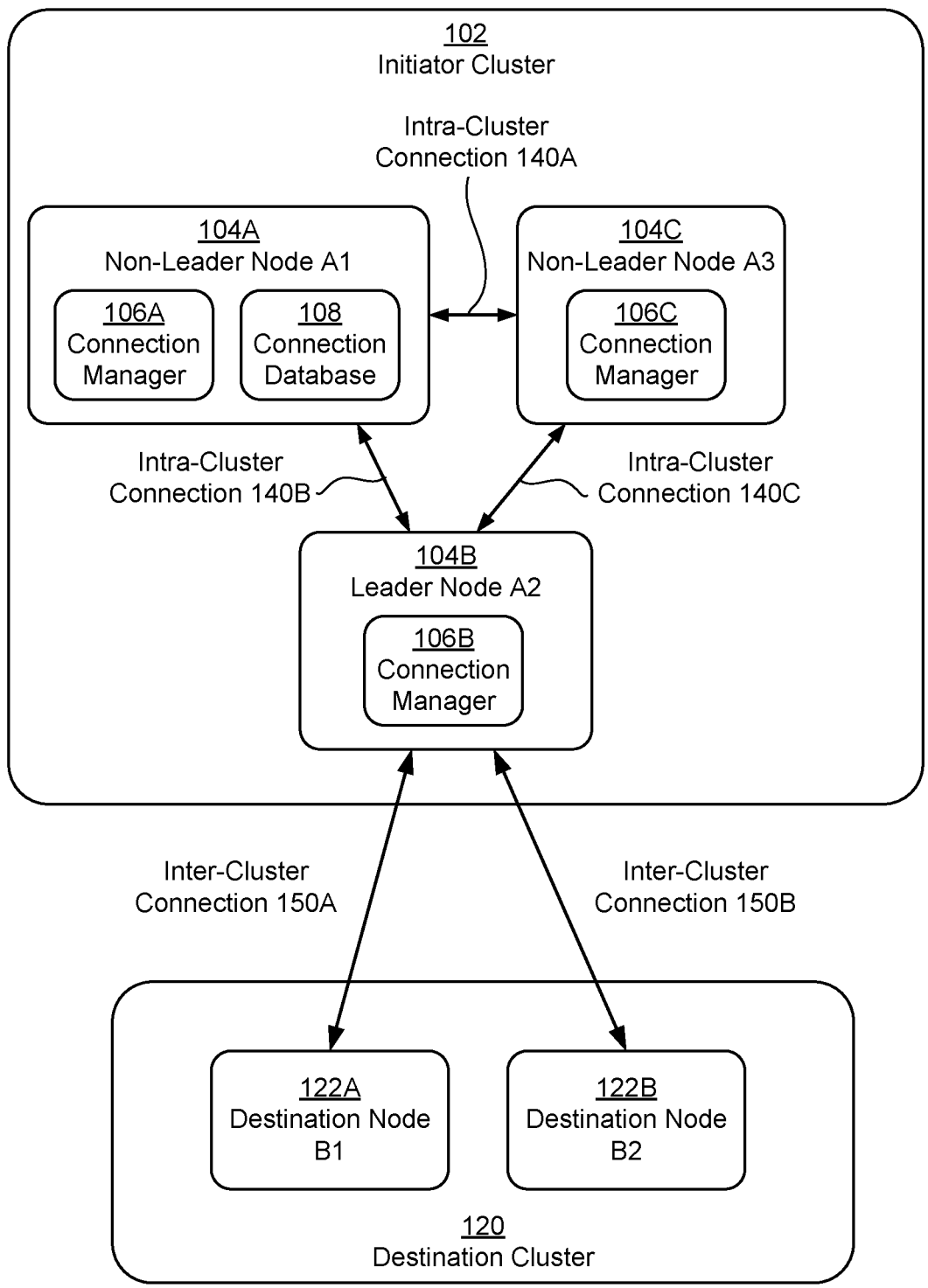
FIG. 1A illustrates a cluster having a leader node that provides inter-cluster communication using network connections between the leader node and destination nodes of a destination cluster, according to various embodiments.

FIG. 1A illustrates an initiator cluster 102, which includes, without limitation, a leader node A2 104B, a non-leader node A1 104A, and a non-leader node A3 104C. The leader node A2 104B provides inter-cluster communication using network connections 150 between the leader node A2 104B and destination nodes 122 of a destination cluster 120, according to various embodiments. A node 104 can be either a leader node or a non-leader node. As shown, leader node A2 104B is associated with one or more inter-cluster connections 150, each of which is a network connection between the leader node A2 104B and a respective destination node 122 of the destination cluster 120. In other words, a leader node A2 104B "owns" each inter-cluster connection 150 with which the node A2 104B is associated. In some embodiments, there is one owner node per inter-cluster connection 150, and each inter-cluster connection 150 is owned by a respective leader node 104. The node 104 that owns an inter-cluster connection 150 can use the connection to send and receive data to a respective destination node 122 of the connection. Nodes 104 that do not own the inter-cluster connection 150 are referred to as non-leader nodes 104, and do not have an inter-cluster connection 150. Non-leader nodes 104 can use an inter-cluster connection 150 by sending data to the leader node A2 104B that owns the inter-cluster connection 150. Upon receiving data from a non-leader node A1 104A, the leader node A2 104B forwards the data by sending the data via the connection. The data is received by the destination node 122 associated with the connection. The destination node 122 can send data to the non-leader node A1 104A by sending the data via the inter-cluster connection 150. The leader node A2 104B receives the data and can determine whether to process the data. If the leader node A2 104B determines that it will process the data, then the leader node A2 104B processes the data without forwarding the data to the non-leader node A1 104A. Otherwise, the leader node A2 104B forwards the data to the non-leader node A1 104A as a response to the data that was sent by the destination node 122.

The terms "initiator" node is used herein for explanatory purposes by referring to cluster 102 as an "initiator cluster" 102 and nodes 104 as "initiator nodes" 104. The term "destination" is used herein for explanatory purposes by referring to cluster 120 as a "destination cluster" 120 and nodes 122 as "destination node" 122.

As shown, initiator cluster 102 includes one or more initiator nodes 104 (referred to herein individually as a node 104 and collectively as nodes 104) on which a connection manager 106 that provides scalable inter-cluster communication is implemented. A destination cluster 120 includes one or more destination nodes 122. Each node 104, 122 can include any technically feasible computing system, such as a server computing system. Illustratively, the hardware of each node 104, 122 includes one or more CPUs, one or more GPUs, system memory, a network interface, storage, and I/O devices such as a mouse and keyboard (not shown). An example of a computing system is described in further detail below in FIG. 8.

Computational tasks can be distributed across nodes 104. Each node 104 can execute, for example, virtual machines, operating systems, applications, or other program code that performs the computational tasks. In some embodiments, nodes 104 can provide one or more services via an infrastructure as a service (IaaS) delivery model. While performing computational tasks, providing services, executing applications, or the like, each node 104 can communicate with other nodes 104, 122 by sending data to and receiving data from the other nodes 104.

Data is sent and received via an intra-cluster network connection 140 that is established between nodes 104, and/or via an inter-cluster network connection 150 that is established between leader node A2 104B and destination nodes 122. The network connections 140, 150 can be created when initiator cluster 102 and/or nodes 104 begin operation, e.g., during an initialization phase.

Network connections can be implemented by networking protocols such as TCP/IP using suitable protocol data structures and operations. A node 104 can perform an "open" operation to open a network connection to another node using a wired or wireless network. A node 104 can send and receive data via the network connection by invoking "send" and "receive" operations while the network connection is open. Data can be sent in the form of streams, messages, packets, or other data formats. A node 104 can close the network connection by invoking a "close" operation. The network protocol implementation (networking "stack") on each node can perform operations for a connection, such as creating timers and processing timeouts while the connection is open. After being closed, the protocol data structures representing the network connection are eventually deleted from memory, and the network protocol stack performs no further operations for the connection.

Nodes 104 can send data to and receive data from ("communicate with") other nodes 104 of initiator cluster 102 via intra-cluster connections 140. The intra-cluster connections 140 use an intra-cluster network, which can be a local-area network or other network having a large bandwidth capacity and low latency. Further, nodes 104 can communicate with nodes 122 of destination cluster 120 via inter-cluster connections 150. The inter-cluster connections 150 can use an inter-cluster network, which can be a wide-area network, the Internet, or other network suitable for communication over longer distances than a local-area network. In some embodiments, nodes 104 can communicate with other computing devices outside of the clusters 102, 120 (not shown) using a suitable network.

Each node 104 is associated with an identifier. For example, non-leader node A1 104A has the identifier "A1", leader node A2 104B has the identifier "A2", and non-leader node A3 104C has the identifier "A3". Further, destination node 122A has the identifier "B1" and destination node 122B has the identifier "B2". Each node identifier can correspond to a network address, such as an Internet Protocol (IP) address.

A cluster pairing operation can be performed to enable nodes 104 of initiator cluster 102 to communicate with nodes 122 of destination cluster 120. Upon pairing, initiator cluster 102 receives information about destination cluster 120, such as cluster and node identifiers, IP addresses, Domain Name Service (DNS), security certificates, and so on. This information is stored in a database and accessed as needed during operation of the initiator cluster 102. During operation, the initiator cluster 102 attempts to maintain a target number N of intra-cluster connections 140 with the destination cluster 120. The target number of connections can be determined as the number of nodes in the initiator cluster 102 divided by a load factor. The load factor can be determined based on an expected computational workload for the initiator cluster 102. For example, if the initiator cluster 102 has 12 nodes and the load factor is 4, the target number of connections is 12/4=3 connections. In this example, the initiator cluster 102, or more specifically the connection manager 106, attempts to maintain 3 open connections to nodes 122 in the destination cluster 120. In some embodiments, a leader node can be elected for each connection, so the number of leader nodes can be the same as the number of connections.

During initialization (e.g., boot up) of the initiator cluster 102, a connection manager 106 at each node 104 performs a leader election protocol. Operations described herein as being performed by a node 104 can be performed by the connection manager 106 at the node 104. At each initiator node 104, the connection manager 106 elects one or more leader nodes, and creates a respective inter-cluster connection from each leader node to each destination node 122 in a destination cluster. The connection manager 106 can also assign a connection identifier (ID) to each inter-cluster connection 150. The connection manager 106 on each initiator node 104 requests ownership of a connection. A connection database 108 stores a representation of each connection and ensures that only one initiator node 104 is selected as a connection owner for each inter-cluster connection 150. If an initiator node 104 is chosen as the owner for a particular inter-cluster connection 150, the connection manager 106 releases any other connection ownerships held by the initiator node 104. The connection manager 106 at the initiator node 104 creates an entry (e.g., row) in the connection database 108 for each granted connection. The initiator node 104 also stores the connection ID (e.g., "1"), the initiator node ID (e.g., "A1"), and the destination node ID (e.g., "B1") in a record in the connection database 108. For example, when ownership of connections to destination nodes B1 and B2 is granted to leader node A2 104B, the connection manager 106B at leader node A2 104B creates the entry associating node ID "A2" with nodes "B1, B2" shown in the second entry (e.g., second row) of table 200A of FIG. 2A.

The leader election protocol can be performed when a connection is lost (e.g., the destination node 122 does not respond within a timeout period) or when the initiator node 104 that owns a connection fails or otherwise becomes unresponsive. When the leader election protocol is performed, the connection database 108 is updated with the node ID of the new initiator node 104 and the ID of the destination node 122 associated with the inter-cluster connection 150. Destination nodes 122 can be assigned to each initiator node 104 using a round-robin allocation to evenly distribute the connections among initiator nodes 104.

As shown in FIG. 1A, leader node A2 104B establishes an inter-cluster connection 150A to destination node B1 122A, and also establishes an inter-cluster connection 150B to destination node B2 122B. The non-leader nodes 104A, 104C create connections to the leader node A2 104B. In this example, the non-leader node A1 104A creates an intra-cluster connection 140B to leader node A2 104B and also creates an intra-cluster connection 140A to non-leader node A3 104C. The non-leader node A3 104C creates an intra-cluster connection 140C to leader node A2 104B. The contents of the connection database 108 that represent these connections of FIG. 1A are shown in FIG. 2A.

To perform a communication operation with the destination cluster 120, such as sending data to a specified node or reading data from the specified node in the destination cluster 120, an initiator node 104 identifies a network connection 140 or 150 based on the address of the specified node. The initiator node 104 then sends or receives data to or from the specified node using the connection.

As an example, if an application running on leader node A2 104B invokes a send operation to send data to destination cluster 120, leader node A2 104B queries the connection database 108 to determine the destination address for the send operation to destination cluster 120. With reference to the table 200A of FIG. 2A, leader node A2 104B queries the connection database 108 for a row having an Initiator Node ID 202A that matches leader node A2's node ID, which is "A2". The query identifies the second row, which has an Initiator Node ID 202A value="A2" and an Address(es) to Access Destination Cluster 204a="A2". The query of the connection database 108 returns the node IDs B1 and B2. Accordingly, leader node A2 104B sends the data to the destination cluster 120 by sending the data to either destination node address ("B1") via the inter-cluster connection 150A or destination node address "B2" via inter-cluster connection 150B. The destination addresses "B1" and "B2" can be a network address (e.g., an IP address) of destination node B1 122A or destination node B2 122B, respectively.

As another example, if an application running on non-leader node A1 104A invokes a send operation to send data to destination cluster 120, non-leader node A1 104A queries the connection database 108 to determine the destination address for the send operation to destination cluster 120. With reference to the table 200A of FIG. 2A, non-leader node A1 104A queries the connection database 108 for a row having an Initiator Node ID 202A that matches non-leader node A1's node ID, which is "A1". The query identifies the first row, which has an Initiator Node ID 202A value="A1" and an Address(es) to Access Destination Cluster 204A="A2". The query of the connection database 108 returns the node ID A2. Accordingly, non-leader node A1 104A sends the data and the identifier of the eventual destination node ("B1") to the node in the initiator cluster 102 having ID="A2", which is the leader node A2 104B. Leader node A2 104B receives the data and the eventual destination address ("B1") via intra-cluster connection 140B. Leader node A2 104B sends the data to the cluster 120 by sending the data to the eventual destination address "B1" via the inter-cluster connection 150A. The destination address "B1" can be a network address (e.g., an IP address) of destination node B1 122A and/or a node identifier such as "B1". The destination node B1 122A receives the data via inter-cluster connection 150A.

Because the connections 140, 150 are bidirectional, the destination nodes 122 of the destination cluster 120 can send data to the initiator nodes 104 of the initiator cluster 102 via the inter-cluster connection 150. In such cases, the nodes 104 are also referred to as destination nodes 104. If the data is being sent to the leader node A2 104B, then the leader node A2 104B receives and processes the data. If the data is being sent to a destination node 104 other than the leader node A2 104B, then the leader node A2 104B forwards the data to the destination node 104. The leader node A2 104B can determine, based on load balancing criteria, whether to process the data itself. For example, if the leader node A2 104B has a lower processor utilization than the other nodes 104, then the leader node A2 104B can process the data instead of forwarding the data to the destination node 104.

Each node 104 can be a leader node A2 104B or a non-leader node A1 104A. Leader nodes A2 104B are selected from the nodes 104 using a leader election protocol. Leader nodes 104 can be elected using APACHE ZOOKEEPER or the like, for example. After a leader node A2 104B has successfully been elected, each of the other nodes 104 recognizes the leader node A2 104B as being a leader, and can communicate with the leader via an intra-cluster connection 140.

A node 104 can transition between being a leader node and being a non-leader node in response to events such as initialization (2&, boot up) of the cluster, during which one or more leaders are elected or when a new leader node is elected to replace the failed leader node. A failed node can recover and resume operations as a non-leader node.

Connection manager 106 and connection database 108 can be software-based components that are hosted on physical hardware of nodes 104. In some embodiments, initiator cluster 102 and/or destination cluster 120 can be implemented in a cloud computing system, such as a computing system implementing a public cloud in which computing services are offered by a provider over the Internet to the public, a private cloud in which computing services are offered to select users, or a hybrid cloud that includes a combination of an on-premise data center that includes privately owned or controlled servers and a public cloud or a private cloud, and/or the like. In one example, initiator cluster 102 can be implemented in a private cloud computing system that includes privately owned or controlled servers.

In some embodiments, nodes 104 can host a hyper-converged infrastructure that includes virtualized compute, storage, network and security, and management. One example of a hyper-converged infrastructure is the Acropolis™ infrastructure commercially available from Nutanix, Inc. of San Jose, California. Although shown as being hosted on nodes 104, connection manager 106 and connection database 108 can be implemented in any technically feasible fashion, including as applications or infrastructure that run on nodes 104.

The connection database 108 can store one or more database tables, each of which provides a mapping of initiator nodes 104 to respective destination nodes to which the initiator nodes are connected by network connections. A database table maps an initiator node 104 of an initiator cluster 102 to one or more destination nodes to (or from) which messages are sent (or received) to communicate with a destination node 122 of a destination cluster 120. The database table can be a data structure that includes a set of records in which each record includes an initiator node field and a destination node field. A value identifying a node can be stored in each initiator node field and each destination node field. The destination node field can include multiple values representing multiple respective destination nodes. The value identifying a node can be a node identifier or network address, for example. Each record can also include an initiator node address field and/or a destination node address field. The destination node address field can include multiple destination node addresses representing multiple respective destination nodes. For example, if node identifiers are stored in the initiator node and destination fields, then network addresses of the nodes can be stored in the initiator node address and destination node address fields. Each record can also include an initiator cluster field in which a value identifying an initiator cluster can be stored, and a destination cluster field in which a value identifying a destination cluster can be stored. For example, the initiator node identifier "A1" identifies a particular node A1 104A, the destination node identifiers "B1" and "B2" identify particular destination nodes B1 122A and B2 122B, and the cluster identifier "B" identifies a particular destination cluster 120. An example record thus contains the an initiator node field having the value "A1" and a destination node field having the values "B1" and "B2." The example record represents two connections: a connection between nodes "A1" and "B1" and a connection between nodes "A1" and "B2."

Each record can include an initiator leader type field that indicates an initiator node type the initiator node identified by the initiator node field. The initiator node type can be leader node or non-leader node. An initiator node type can be associated with an initiator node to indicate whether the initiator node is a leader node. An initiator node address in a record is an address of a leader node when the initiator node type of the record is a leader node. A destination node address in a record is an address of a leader node when the initiator node type of the record is a non-leader node. Further, an initiator node address in a record is an address of a non-leader node when the initiator node type of the record is a non-leader node. A destination node address in a record is an address of an initiator node when the initiator node type of the record is a leader node.

FIG. 1B illustrates initiator cluster 102 having a leader node A2 104B that has failed, according to various embodiments. The node failure can be detected by, for example determining that no response has been received from the leader node A2 104B by any of the non-leader nodes 104A, 104C within a threshold timeout period. It is also possible that the leader node A2 104B has not failed, but the network link (e.g., a wired or wireless communication medium) has failed or is transferring data very slowly, e.g., because of a lost or weak wireless signal. Such a network issue that is prolonged, e.g., for a sufficient amount of time such as a timeout period, can result in the non-failed nodes 104 determining that the leader node A2 104B has failed. When the leader node A2 104B or a prolonged network issue occurs, the network connections 140, 150 are eventually closed by the nodes 104, 120.

Figure 1C:
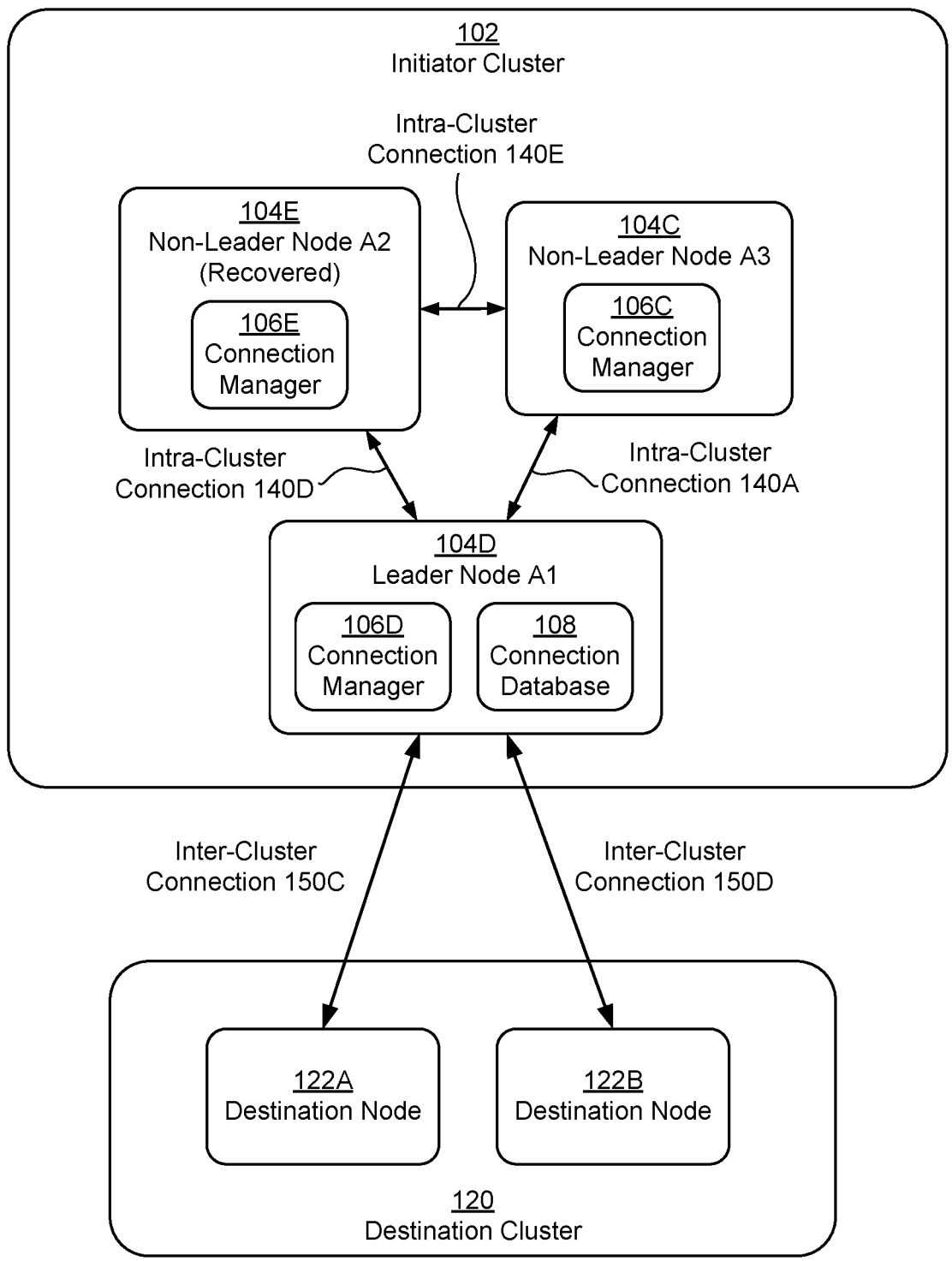
FIG. 1C illustrates a cluster having a new leader node that has replaced a failed leader node, according to various embodiments.

When a leader node A2 104B fails or otherwise becomes unavailable to operate as a leader node, a new leader node 104 is elected from the non-leader nodes and assigned to the inter-cluster connections 150 that were assigned to the failed leader node A2 104B, as described herein with respect to FIG. 1C. An update is provided to each of the remaining non-leader nodes indicating that the failed leader node has been replaced by the new leader node. The non-leader nodes update their respective connection lists by changing the network address of the failed leader node to the network address of the new leader node.

FIG. 1C illustrates initiator cluster 102 having a new leader node A1 104D that has replaced a failed leader node A2 104B, according to various embodiments. When the leader node 140B fails, a new leader node i104D is elected from the non-leader nodes 104A, 104C and assigned to the inter-cluster connections 150 that were assigned to the failed leader node 140B. In this example, the leader election protocol is performed, and the non-leader node A1 104A obtains ownership of both inter-cluster connections 150A and 150B (to destination nodes B1 122A and B2 122B, respectively). Accordingly, non-leader node A1 104A becomes the new leader node A1 104D and obtains inter-cluster connection 150C and inter-cluster connection 150D. To obtain ownership of an inter-cluster connection 150, the non-leader node A1 104A participates in a leader election protocol by requesting ownership of a connection. Multiple non-leader nodes can request ownership of a connection to a specified destination node 122 simultaneously or at different times. The connection manager 106 can use the connection database 108 to ensure that up to a threshold number of the requesting nodes 104 are granted ownership of connections to one or more destination nodes 122 specified in a record in the connection database 108. For example, the connection manager 106 can identify a database record having an initiator node ID field that matches node ID of a requesting node 104. The requesting node 104 can be granted ownership of a connection to each destination node 122 identified by an address in an address(es) to access destination cluster field of the identified database record. Each of the requesting nodes 104 that is granted ownership to a connection to a destination node 122, and thus becomes a leader node 104, can establish a separate network connection with the destination node 122. Alternatively, the requesting nodes 104 that are granted ownership to a connection with a destination node 122 can use the same network connection, in which case synchronization can be used to avoid simultaneous use of the network connection by multiple nodes. Although examples are described herein in which the connection manager 106 identifies destination nodes 122 using node identifiers specified in database records, the connection database 108, the connection manager 106 can alternatively establish a connection between each initiator node 104 of the initiator cluster 102 and each destination node 122 of the destination cluster 120. For example, each destination node 122 of the destination cluster 120 can be identified using a list of destination nodes 122 of the destination cluster 120.

If a leader node changes, e.g., in response to election of a new leader after a previous leader has failed, the new leader node A1 104D updates the connection database 108 by changing the Address(es) to Access Destination Cluster 204B of the row for node "A1" (the first row) to "B1, B2" and setting the Address(es) to Access Destination Cluster 204B of the row for node "A2" to an empty value, indicating that no destination nodes are connected to leader node A2 104B. The new leader node A1 104D also sets the Address(es) to Access Destination Cluster 204B of nodes that were connected to the failed leader node to reference the new leader. In this example, the Address(es) to Access Destination Cluster 204B value in the row for node "A3" (the third row) is set to "A1"

Upon detecting failure of a node A2 104B, the connection manager 106 running on one or more of the initiator nodes 104 performs a node recovery operation to recover the failed node A2 104B. The connection manager 106 can select another node to replace the failed node A2 104B. The failed node A2 104B reboots or otherwise recovers from the failure, so the connection manager 106 determines that the leader node A2 104B is again available. In this example, the connection manager 106 selects the recovered node A2 as a recovered non-leader node A2 104E. The connection manager 106D establishes a connection 140D between the recovered non-leader node A2 104E and the new leader node A1 104D. The connection manager 106 also establishes a connection 140E between the recovered non-leader node A2 104E and the non-leader node A3 104C.

Upon determining that non-leader node A2 104E has recovered and is operational, the new leader node A1 104D updates the connection database 108 by changing the Address(es) to Access Destination Cluster 204B of the row for node "A" (the second row) to "A1" to indicate that the recovered non-leader node A2 104E can send data to nodes outside the initiator cluster 102 by sending the data to new leader node A1 104D, which forwards the data to a specified destination address.

FIG. 2A illustrates an example connection table 200A that associates each initiator node in an initiator cluster with addresses other initiator node(s) or destination node(s) to which the initiator node is connected, according to various embodiments. Each row of the table represents a table entry that includes an initiator node 104 specified in the Initiator Node ID 202A column and the Node IDs of one or more other connected nodes to which the initiator node 104 can send data having a destination node 122 in the destination cluster 120. Each initiator node 104 in the Initiator Node ID 202A column of a table entry is connected to a connected node 104 or 122 specified in the Address(es) to Access Destination Cluster 204A column.

The first row of table 200A indicates that node A1 can send data destined for the destination cluster 120 to node A2, which is the leader node connected to the destination nodes 122 of the destination cluster 120. The second row of table 200A indicates that leader node A2 can send data destined for the destination cluster 120 to either of nodes B1 or B2. Leader node A2 can select either B1 or B2 as the destination, based on the destination address provided by the sending node 104 with the data. The third row of table 200A indicates that node A3 can send data destined for the destination cluster 120 to leader node A2.

FIG. 2B illustrates an example connection table 200B subsequent to failure of a leader node, according to various embodiments. The table 200B has an Initiator Node ID column 202B and an Address(es) to Access Destination Cluster column 204B. The first row of table 200B has been changed in response to leader node A1 104D being elected. The first row of table 200B now has the Address(es) to Access Destination Cluster 204B set to "B1, B2" to indicate that new leader node A1 104D. The third row of table 200B now has the Address(es) to Access Destination Cluster 204B set to "A1" to indicate that node A3 can send data destined for the destination cluster 120 to new leader node A1 104D.

FIG. 2C illustrates an example connection table 2000 subsequent to election of a new leader node, according to various embodiments. The table 2000 has an Initiator Node ID column 202C and an Address(es) to Access Destination Cluster column 204C. The second row of table 200C has been changed in response to non-leader node A2 104E being recovered and available for use. The second row of table 200C now has the Address(es) to Access Destination Cluster 204C set to "A1" to indicate that recovered non-leader node A2 104E can send data destined for the destination cluster 120 to new leader node A1 104D.

Figure 3:
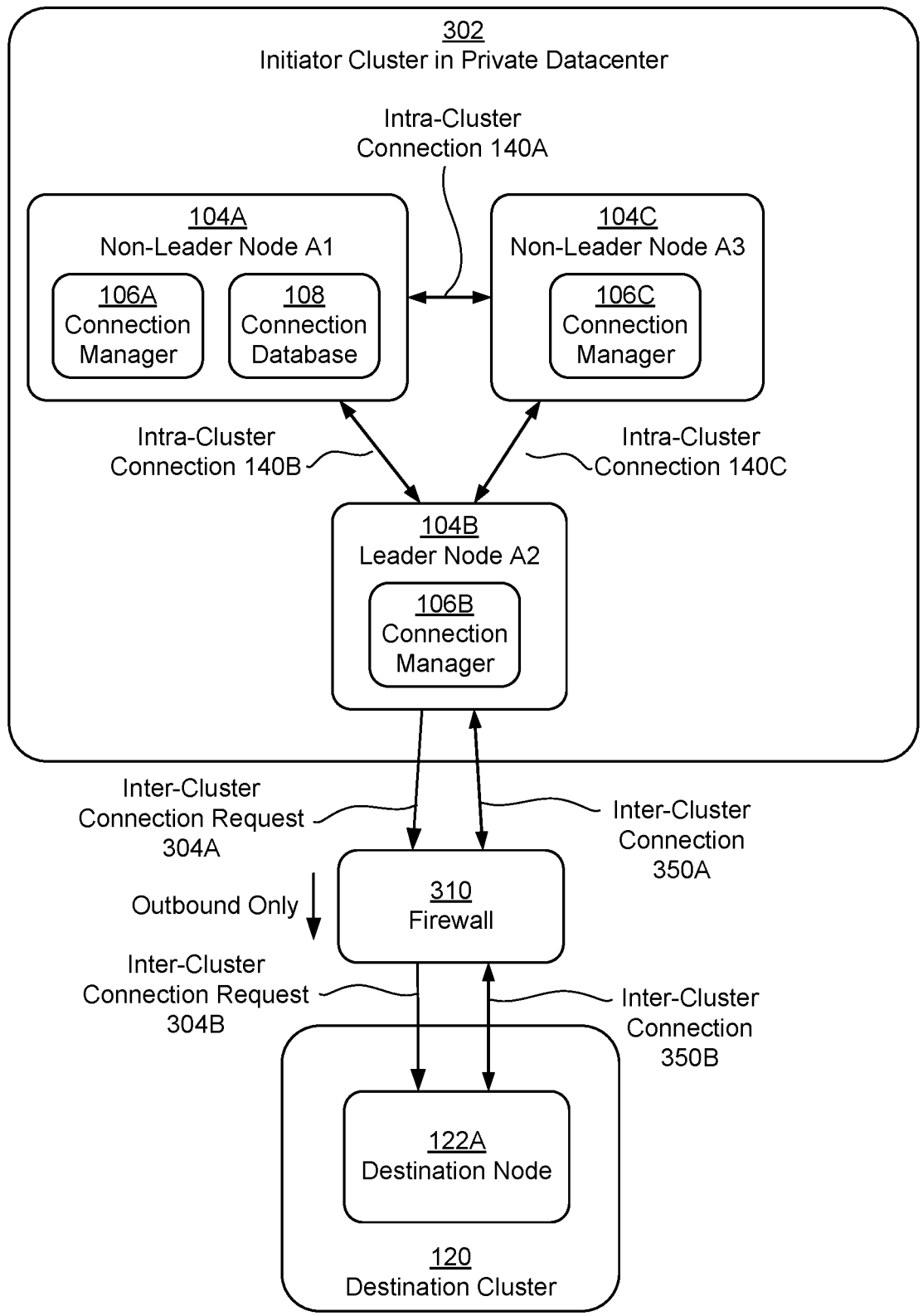
FIG. 3 illustrates establishment of an inter-cluster connection between a leader node in a cluster in a private datacenter and a destination node via a firewall that prevents external nodes from initiating connections to nodes of the cluster.

FIG. 3 illustrates establishment of an inter-cluster connection between a leader node A2 104B in an initiator cluster 302 in a private datacenter and a destination node 122A via a firewall 310 that prevents external nodes from initiating connections to nodes of the cluster. Firewall 310 prevents nodes 122 of clusters 120 from initiating connections to nodes 104 of the initiator cluster 302. For example, firewall 310 can prevent unauthorized connections from being established to nodes of the private datacenter. A bidirectional connection can be established, however, by leader node A2 104B. To establish a connection to a destination node 122A, the connection manager 106B of leader node A2 104B requests that a connection be opened to the destination node B1 122A by sending an inter-cluster connection request 304A. The firewall 310 allows the inter-cluster connection request 304A to pass through because it is an outbound request from the initiator cluster 302. The firewall 310 thus sends an inter-cluster connection request 304B to the destination node B1 122A. The destination node B1 122A sends an acknowledgement to the leader node A2 104B. For example, the destination node B1 122A performs a TCP/IP three-way handshake with the leader node A2 104B to establish an inter-cluster connection 350 between the leader node A2 104B and the destination node B1 122A. The connection includes an inter-cluster connection 350A between the leader node A2 104B and the firewall 310, and an inter-cluster connection 350B between the firewall 310 and the leader node A2 104B. The leader node A2 104B can use the inter-cluster connection 350 to communicate with the destination cluster 120 on behalf of the non-leader nodes 104A, 104C as described herein with respect to FIGS. 1A-1C, for example.

Figure 4A:
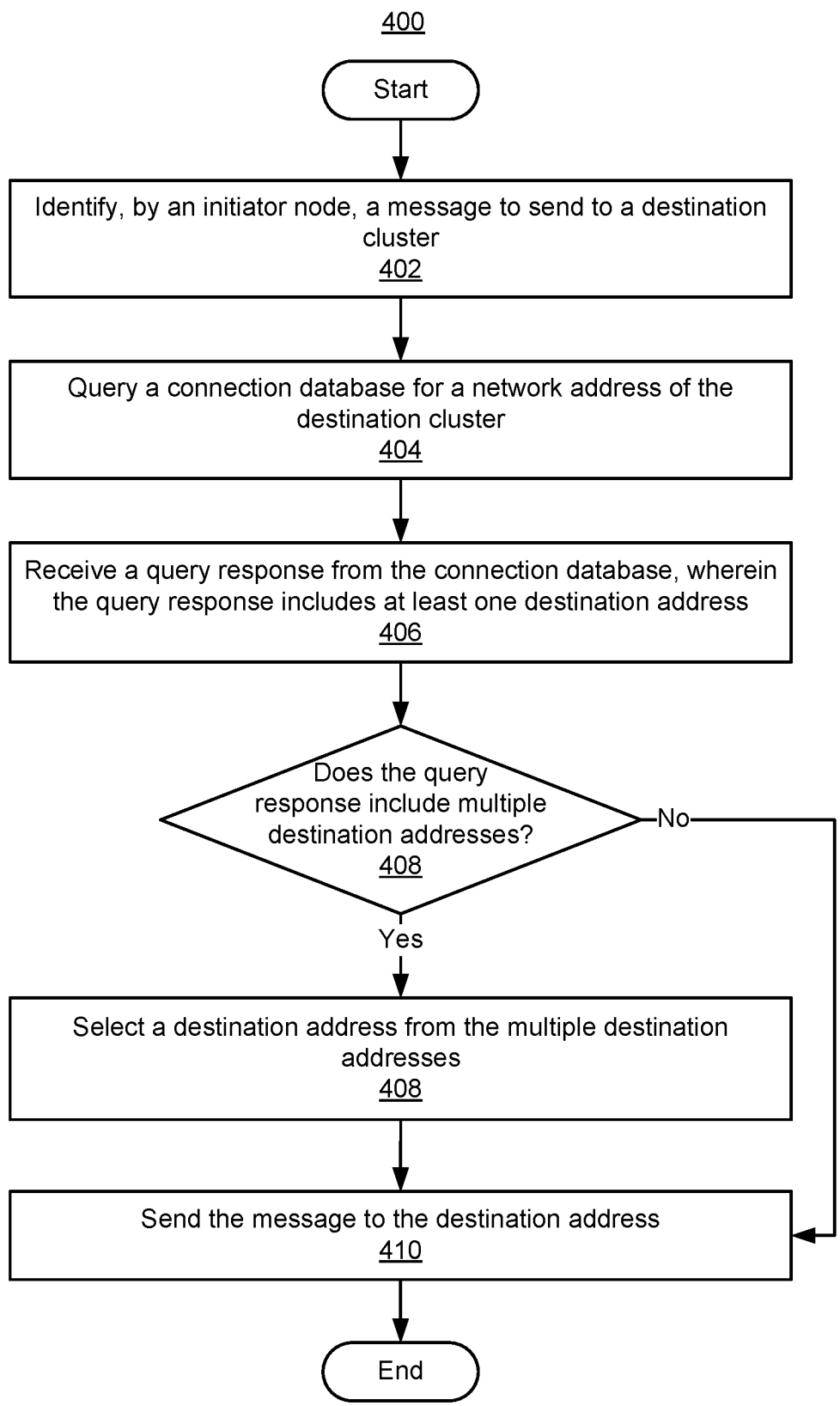
FIG. 4A is a flow diagram of method steps for determining a network address to use for communication with a destination cluster, according to various embodiments.

FIG. 4A is a flow diagram of method steps for determining a network address to use for communication with a destination cluster, according to various embodiments. In some embodiments, the method steps of FIG. 4A can be performed by any computing device, system, or cluster node, such as any of the computing systems described herein with respect to FIGS. 7A-8. In some embodiments, the method steps of FIG. 4A can be performed by a connection manager 106 located on an initiator node 104 of an initiator cluster 102.

As shown, a method 400 begins at a step 402, where a connection manager 106 identifies, by an initiator node 104, a message to send to a specified destination cluster 120. The connection manager 106 executing on the initiator node 104 can receive a "send request" specifying the message to be sent to the destination cluster 120. The connection manager 106 can receive the send request from an invoker, which can be, for example, an operating system, application, or other program code that communicates with other nodes via a computer network. The invoker can provide the send request to the connection manager 106, e.g., via a procedure call within an operating system process, a remote procedure call (RPC) from another operating system process and/or from another node 104, a request message, or other suitable form of invocation. The send request and/or the message specifies a destination identifier, which can be an identifier of the destination cluster 120 or an identifier of a destination node 122 in the destination cluster 120. In one example, the node ID "B1" identifies a destination node B1 122A in the destination cluster 120. In another example, the cluster identifier "B" identifies a destination cluster 120.

At step 404, connection manager 106 queries a connection database 108 for a network address of the destination cluster. The connection database 108 can be in the same node 104 as the connection manager 106 or on a different node 104 of the initiator cluster 102. The connection manager 106 can query the connection database by invoking method 450 of FIG. 4B, for example. The connection manager 106 provides the destination identifier to the method 450 as input, and the method 450 returns one or more destination addresses to which the message can be sent to cause the message to be delivered to the destination node 122 identified by the destination identifier.

At step 406, connection manager 106 receives a query response from the connection database 108. The query response includes one or more returned destination addresses. If the initiator node 104 is a leader node, then each returned destination address is a network address of a destination node 122 in the destination cluster 120. Alternatively, if the initiator node 104 is not a leader node, then each returned destination address is a network address of a leader node A2 104B in the initiator cluster 102. In the latter case, the initiator node 104 can send messages to the leader node A2 104B, and the leader node A2 104B forwards the messages to a destination node 122 in the destination cluster 120.

At step 408, the connection manager 106 determines whether the query response includes multiple destination addresses. The query response can include multiple destination addresses if, for example, the query is from a leader node and the destination identifier received at step 402 is an identifier of a destination cluster 120, in which case the query response can include addresses of multiple destination nodes 122 in the destination cluster 120. Any of these destination node addresses can be used to send the message to a destination node 122 in the cluster specified by the destination identifier. In another example, the query response can include multiple destination addresses if the initiator node 104 is a non-leader node, in which case the destination addresses can be addresses of multiple leader nodes in the initiator cluster 102, each of which has a connection to the destination node 122 in the destination cluster 120. Any of these leader node addresses can be used to send the message to the destination cluster specified by the destination identifier because any of the respective leader nodes will forward the message to a node in the destination cluster.

If the query response includes multiple destination addresses, then method 400 continues to step 408, where connection manager 106 selects a destination address from the multiple destination addresses. Connection manager 106 can select one of the destination nodes 122 in the destination cluster 120 in round-robin order, such that each invocation of the method 400 selects the destination node from the destination node 122 according to an ordering of the destination nodes 122. For example, each successive invocation of the method 400 can select the next destination node in the ordering. Alternatively, in each invocation of the method 400, connection manager 106 can select the destination node from the of destination nodes 122 in the destination cluster 120 based on an attribute of each of the destination nodes, such as an average amount of processor load or an average amount of network bandwidth used by the destination node over a period of time. The method 400 proceeds from step 408 to step 410, where the connection manager 106 sends the message to the selected destination address. On the other hand, if the query response does not include multiple destination addresses, then method 400 proceeds to step 410, where connection manager 106 sends the message to a single destination address specified in the query response.

Figure 4B:
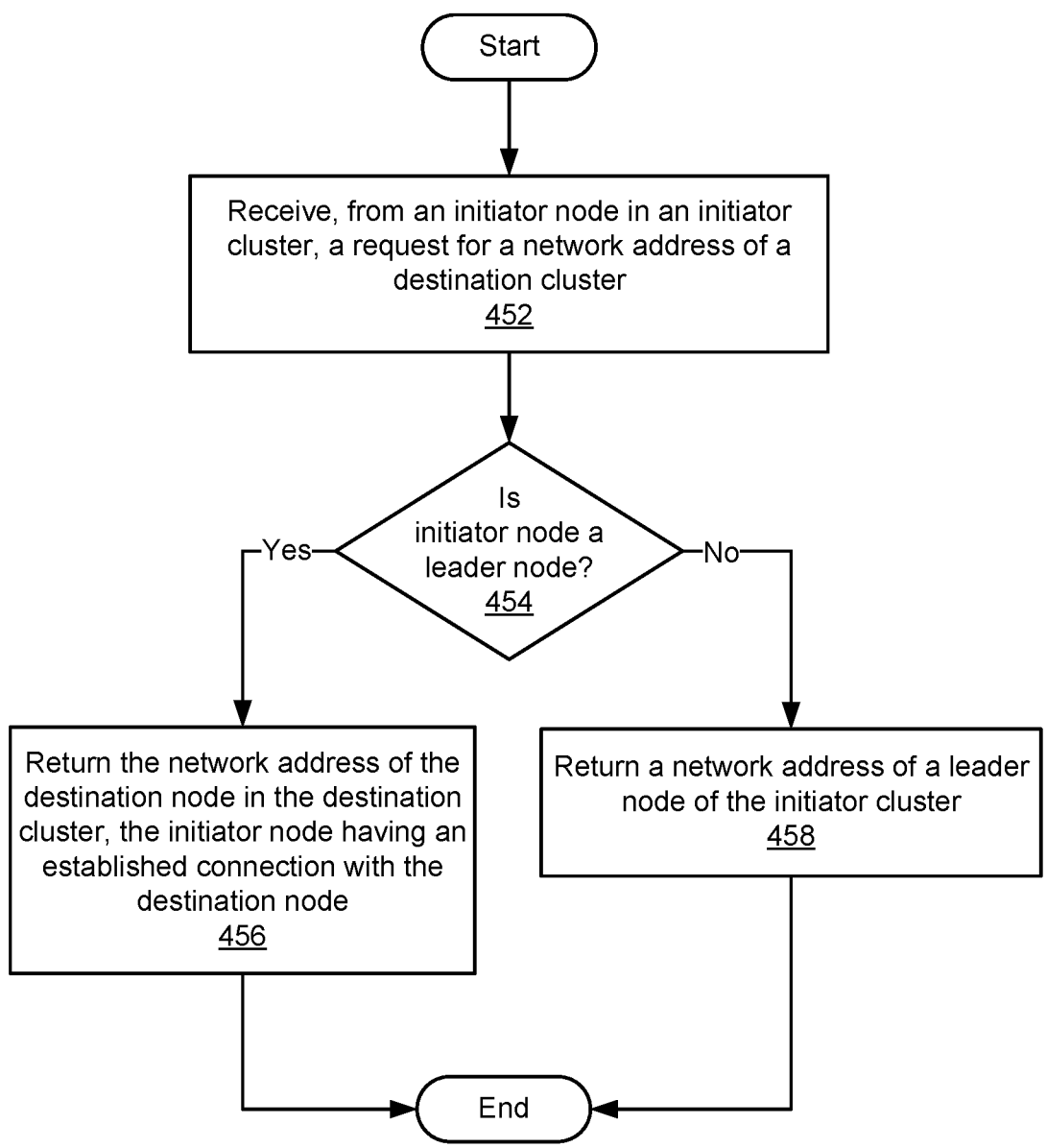
FIG. 4B is a flow diagram of method steps for querying a connection database for a network address to use for communication with a destination node in a destination cluster, according to various embodiments.

FIG. 4B is a flow diagram of method steps for querying a connection database 108 for a network address to use for communication with a destination node in a destination cluster, according to various embodiments. In some embodiments, the method steps of FIG. 4B can be performed by any computing device, system, or cluster node, such as any of the computing systems described herein with respect to FIGS. 7A-8. In some embodiments, the method steps of FIG. 4B can be performed by a connection manager 106 located on a cluster node 104.

As shown, a method 450 begins at a step 452, where a connection manager 106 receives, from an initiator node 104 in an initiator cluster, a request for a network address of a destination cluster 120. The request for a network address can specify a destination identifier, which can be an identifier of the destination cluster 120 or an identifier of the destination node 122, such as a node identifier, in the destination cluster 120. For example, the node identifier "B1" identifies a particular destination node B1 122A in destination cluster 120. The cluster identifier "B" identifies a particular destination cluster 120.

The method 450 can receive the request for a network address from an invoker, which can be, for example, an operating system, application, or other program code that communicates with other nodes via a computer network. The invoker can be the method 400 of FIG. 4A, in which case step 404 of method 400 sends the request for a network address to the connection manager 106 at step 404. The invoker can invoke the method 450 and provide the request as a parameter to the connection manager 106, e.g., via a procedure call within an operating system process, a remote procedure call (RPC) from another operating system process and/or from another node 104, a request message, or other suitable form of invocation. The network address can be an identifier that can be used to send communications to the specified destination node via an inter-cluster connection 150. For example, the network address can be an IP address (e.g., 192.158.1.38). Method 450 returns a result specifying the network address of the requested destination node 122. The result can be returned as a procedure call result, a response message, or other suitable form of response to the request for a network address.

At step 454, connection manager 106 determines whether the initiator node 104 is a leader node. In some embodiments, connection manager 106 can determine whether the initiator node 104 is a leader node based on an attribute of the initiator node 104 that indicates whether the initiator node 104 has been elected as a leader node by a leader election process. Alternatively, connection manager 106 can maintain a list of leader nodes and determine whether the initiator node 104 is a leader node using the list. If the initiator node is in the list of leader nodes, then connection manager 106 determines that the initiator node is a leader node. Otherwise, connection manager 106 determines that the initiator node is not a leader node. Connection manager 106 can update the list of leader nodes by adding the identifier of each leader node to the list in response to the leader node being elected, and remove a leader node identifier from the list in response to the identified leader node becoming a non-leader node.

If the initiator node 104 is a leader node, then method 450 continues to step 456. In this case, the initiator node 104 has network connections to the nodes in the destination cluster 120. As described above, the specified destination identifier can be an identifier of a destination cluster 120 or an identifier of a destination node 122.

If the initiator node 104 is a leader node and the destination identifier parameter is a node identifier that identifies a destination node 122, then at step 456 connection manager 106 determines the network address of the destination node 122 and returns the network address as a result of the method 450. The network address of the destination node 122 can be used to communicate with the destination node 122 via the established network connection between the initiator node 104 and the destination node 122.

Connection manager 106 uses a connection database 108 to determine the network address of the destination node 122. If the initiator node 104 is a leader node, the destination node is a destination node 122 in the destination cluster 120. The initiator node 104 can communicate with the destination node 122 via a network connection. Alternatively, if the initiator node 104 is a non-leader node, the destination node is a leader node 104 in the initiator cluster 102. The initiator node 104 can communicate with a destination node 122 in the destination cluster 120 via the initiator node 104. The connection database 108 can store a set of database tables, Each database table can be associated with a particular destination cluster 120, in which case a particular table that corresponds to a specified cluster can be identified prior to searching the table for destination nodes to which messages can be sent. Alternatively or in addition, each database table in the connection database 108 can include a cluster identifier as a field or column, in which case a table can be searched for nodes in a particular cluster by specifying a particular cluster identifier as a query parameter.

To determine the network address of the destination node 122, connection manager 106 queries a connection database 108 for a database record that associates the initiator node 104 with the destination node 122. The database query can be performed using a node identifier of the initiator node 104 and a node identifier of the destination node 122 as a query search parameters or filters. For example, the query can search for a record having an initiator node field value, such as a node identifier, that matches an identifier of the initiator node 104 and a destination node field value, such as a node identifier, that matches an identifier of the destination node 122.

The database query identifies the database record that maps the node identifier of the initiator node 104 to the node identifier of the destination node 122. The network address of the destination node 122 can be included in the identified record, or can be determined from the node identifier of the destination node 122. In some embodiments, the database record can include a connection identifier that can be used to send the message via a network connection to the destination node 122. A connection identifier can be a file descriptor or other suitable value. Method 450 can return the network address of the destination node 122 or the connection identifier of the network connection to the destination node 122 as a result. The result can be returned as a procedure call result or other suitable form of result.

If the initiator node 104 is a leader node and the destination identifier parameter is a cluster identifier that specifies a destination cluster 120, then at step 456 connection manager 106 determines the network addresses of destination nodes 122 in the destination cluster 120 to which the initiator node 104 has network connections. The connection manager 106 then returns the determined network addresses as results of the method 450. For example, if the initiator node 104 has a network connection to each destination node 122 in the specified destination cluster 120, then connection manager 106 returns a list that includes the network address of each destination node 122 in the destination cluster 120 as a result of the method 450. Any of the network addresses of the destination nodes 122 can be used to communicate with the destination cluster 120 via the respective established network connections between the initiator node 104 the respective destination nodes 122. To determine the network addresses of the destination node 122, connection manager 106 queries a database table of a connection database 108 for a database record that associates the initiator node 104 with the destination node 122. The database query can be performed using a node identifier of the initiator node 104 and the cluster identifier specified in the destination identifier parameter as query search parameters. For example, the query can search for a record having an initiator node field value (such as a node identifier) that matches an identifier of the initiator node 104 and a cluster identifier field value (such as a cluster identifier) that matches the specified cluster identifier. Alternatively, instead of including the cluster identifier in the query, database tables can be associated with cluster identifiers, and a table associated with the specified cluster identifier can be selected and searched for an initiator node field that an identifier of matches the initiator node 104.

The database query identifies the database record that contains the node identifier of the initiator node 104 and one or more nodes of the destination cluster identified by the cluster identifier. That is, the identified record contains one or more node identifiers of destination nodes 122 in the identified cluster that are connected to the initiator node 104 via network connections. The network addresses of the destination nodes 122 can be retrieved from the identified record, or can be determined from the node identifiers of the destination nodes 122. Method 450 can return the network addresses of the destination nodes 122 (or, alternatively, connection identifiers of the network connections to the destination node 122) as results.

On the other hand, if step 454 determines that the initiator node 104A is not a leader node 104B, then method 450 proceeds to step 458, where connection manager 106 returns a network address of a leader node 104B of the initiator cluster 102. Since the initiator node 104A is not a leader node in this case, the initiator node 104A does not have a connection to the destination node. Instead, the initiator node 104A communicates with the destination node 122 via a leader node 104B identified by querying the connection database 108.

To determine the network address of a leader node 104B of the initiator cluster 102, connection manager 106 queries the connection database 108 for a database record that associates the initiator node 104 with at least one leader node 104B. The database query can be performed using a node identifier of the initiator node 104 as a query search parameter. For example, the query can search for a record having an initiator node field value that matches an identifier of the initiator node 104.

The database query identifies a database record that maps the node identifier of the initiator node 104A to one or more other node identifiers. Since the initiator node 104A is not a leader node, the database record maps the non-leader node 104A to one or more leader nodes of the initiator cluster 102. More specifically, the database record can map the non-leader node A1 104A to one or more leader node identifiers and/or one or more leader node network addresses. The network addresses of the one or more leader nodes can be included in the database record, or, alternatively, can be determined from the leader node identifiers using a suitable mapping table or name resolution service.

In some embodiments, the database record can include a connection identifier for each leader node. The connection identifiers can be used to send messages via a network connection to the respective leader nodes. Method 450 can return the network address(es) of the one or more leader nodes identified by the database record, or the connection identifiers of the respective network connections to the one or more leader nodes, as results. The results can be returned as a procedure call result or other suitable form of result.

FIG. 5 is a flow diagram of method steps for initializing or updating network connections in an initiator cluster, according to various embodiments. In some embodiments, the method steps of FIG. 5 may be performed by any computing device, system, or cluster node, such as any of the computing systems described herein with respect to FIGS. 7A-8. In some embodiments, the method steps of FIG. 5 can be performed by a connection manager 106 located on a cluster node 104. The method steps of FIG. 5 can be performed in response to events such as initialization (e.g., boot up) of the cluster, detection of a node failure or communication timeout, a request from a leader node to be changed to a non-leader node, an increase in a target number of leader nodes, or other events that can affect the number of leader nodes. The connection manager 106 can the failure of a leader node by, for example determining that no response has been received from the leader node by any of the non-leader nodes 104A, 104C within a threshold timeout period. Detection of a failure is described further herein with respect to FIG. 1B.

As shown, a method 500 begins at a step 502, where a connection manager 106 determines that a number of existing leader nodes in an initiator cluster is less than a target number of leader nodes for the initiator cluster. The method 500 determines whether the number of existing leader nodes is below a target number, and if so, elects a new leader node, establishes network connections to and from the new leader node, and updates the connection database 108 to include mappings that represent the newly established network connections. The connection manager 106 can determine the number of existing leader nodes using a count of leader nodes that is incremented when a leader node is elected and decremented when a leader node fails, becomes a non-leader node, or is otherwise determined to be unavailable. In other examples, the connection manager 106 can determine the number of existing leader nodes using any suitable technique, such as by counting the number of leader nodes in the connection database 108 or counting the number of leader nodes in a list of leader nodes maintained by the connection manager 106. The target number of leader nodes can be determined based on the number of initiator nodes 104 and a load factor, as described herein with respect to FIG. 1A.

At step 504, connection manager 106 elects one or more new leader nodes in the initiator cluster. The number of new leader nodes is determined based on a difference between the target number of leader nodes and the number of existing leader nodes in the initiator cluster. The connection manager 106 elects the new leader node by performing a leader election protocol as described further herein with respect to FIG. 1C.

At step 506, connection manager 106 on a leader node 104 creates, for each of the new leader nodes, one or more inter-cluster network connections. The one or more inter-cluster network connections include, for each respective destination node in a destination cluster, an inter-cluster network connection between the new leader node and the respective destination node.

At step 508, connection manager 106 on a leader node 104 updates, for each of the inter-cluster network connections, a connection database of the initiator cluster to include a representation of a connection between the new leader node of the inter-cluster network connection and the destination node of the inter-cluster network connection. The representation of the connection can be a record in a table of connection database 108, for example. The record can include an initiator node field with a value that identifies the new leader node and a destination node field with a value that identifies the destination node of the inter-cluster network connection.

At step 510, connection manager 106 on a leader node 104 or non-leader node 104 creates, for each of the new leader nodes, one or more intra-cluster network connections, wherein the one or more intra-cluster network connections include, for each respective non-leader node in the initiator cluster, an intra-cluster network connection between the new leader node and the respective non-leader node. At step 512, connection manager 106 updates, for each of the intra-cluster network connections, the connection table of the initiator cluster to include a representation of a connection between the new leader node of the intra-cluster network connection and the destination node of the intra-cluster network connection.

Figures 6A, 6B:
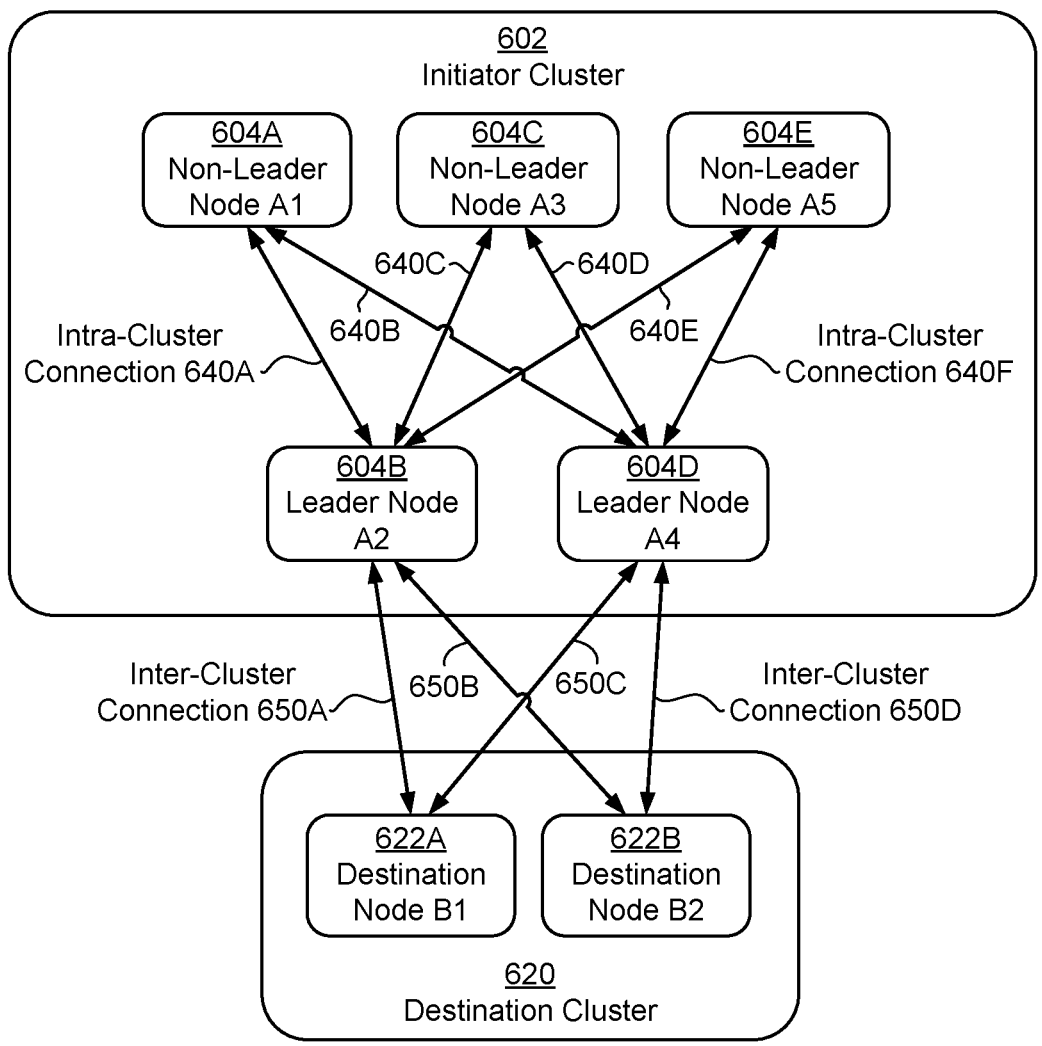
FIG. 6A illustrates an example initiator cluster having nodes that initiate connections to an example destination cluster, according to various embodiments.
FIG. 6B illustrates an example connection database in which information about the connections shown in FIG. 6A is stored, according to various embodiments.

FIG. 6A illustrates an example initiator cluster 602 having nodes 604 that initiate connections to an example destination cluster 620, according to various embodiments. Initiator cluster 602 includes, without limitation, a leader node A2 604B, a leader node A4 604D, and non-leader nodes A1 604A, A3 604C, and A5 604E. FIG. 6B illustrates an example connection database in which information about the connections shown in FIG. 6A is stored, according to various embodiments.

Each of the leader nodes A2 604B, A4 604D is connected to each of the destination nodes B1 622A, B2 622B by an inter-cluster connection 650. In the example initiator cluster 102, non-leader node A1 604A is connected to leader node A2 604B via intra-cluster connection 640A and to leader node A4 604D. via intra-cluster connection 640B. Further, non-leader node A3 604C is connected to leader node A2 604B via intra-cluster connection 640C and to leader node A4 604D via intra-cluster connection 640D. Still further, non-leader node A5 604E is connected to leader node A2 604B via intra-cluster connection 640E and to leader node A4 604D via intra-cluster connection 640F.

The intra-cluster connections 640 can be established by the method 500 of FIG. 5 at cluster boot-up time, which can occur when the initiator cluster 602 is initialized. When the initiator cluster 602 is initialized, at step 502, the connection manager 106 determines that the number of existing leader nodes in the cluster is less than a target number, which is 2 leader nodes in this example. At step 504, the connection manager 106 elects a number of new leader node. The number of new leader nodes is determined based on a difference between the target number and the number of existing leader nodes. In this example, the difference is 2−0=2 leader nodes, and the connection manager 106 elects 2 new leader nodes 604B, 604D.

At step 506, for each of the new leader nodes, the connection manager 106 creates inter-cluster connections 650 to each destination node 622A, 622B in a destination cluster 620. Accordingly, the connection manager 106 creates inter-cluster connections 650A and 650B between leader node A2 604B and the respective destination nodes B1 622A and B2 622B, respectively. Further, at step 506 the connection manager 106 creates inter-cluster connections 640C and 650D between leader node A4 604D and the respective destination nodes B1 622A and B2 622B.

At step 508, for each of the inter-cluster connections 650 created in step 506, the connection manager 106 updates a connection database 108 of the initiator cluster 602 to include a representation of a connection between the new leader node of the inter-cluster connection 650 and the destination node of the inter-cluster connection 650. The connection manager 106 can update the connection database 108 to include one or more records, each representing one of the inter-cluster connections 650 created at step 506. For example, for the inter-cluster connection 650A, the connection manager 106 can add a record that includes the node identifier "A2" of the leader node A2 604B and the node identifier "B1" of the destination node B1 622A to an example connection table 660 shown in FIG. 6B. The record representing the connection between A2 and B1 is shown as row #2 of the table 660, which has an initiator node ID 664 of "A2" and an Address(es) to Access Destination Cluster 666 node ID of B1 (in addition to B2, which is described below).

Further, for the inter-cluster connection 650B, the connection manager 106 can add a record that includes the node identifier "A2" of the leader node A2 604B and the node identifier "B2" of the destination node B2 622B to the example connection table 660. The record representing the connection between A2 and B2 is shown as row #2 of the table 660, which has an initiator node ID 664 of "A2" and an Address(es) to Access Destination Cluster 666 node ID of B2 (in addition to B1).

For the inter-cluster connections 650C and 650D, the connection manager 106 can add a record that includes the node identifier "A4" of the leader node A4 604D and the node identifiers "B1" (of destination node B1 622A) and "B2" (of destination node B2 622B). The record representing the connection between A4 and B1 and also representing the connection between A4 and B2 is shown as row #4 of the table 660, which has an initiator node ID 664 of "A4" and an Address(es) to Access Destination Cluster 666 node IDs 666 of "B1, B2".

At step 510, for each of the new leader nodes, the connection manager 106 creates one or more intra-cluster network connections. The intra-cluster network connections include, for each respective non-leader node in the initiator cluster 602, an intra-cluster network connection between the new leader node and the respective non-leader node. For example, for the new leader node A2 604B, the connection manager 106 creates an intra-cluster connection 640A between the leader node A2 604B and the non-leader node A1 604A, as well as an intra-cluster connection 640C between the leader node A2 604B and the non-leader node A3 604C, and an intra-cluster connection 640E between the leader node A2 604B and the non-leader node A5 604E.

Further, for the leader node A4 604D, at step 510 the connection manager 106 creates an intra-cluster connection 640B between the leader node A4 604D and the non-leader node A1 604A as well as an intra-cluster connection 640D between the leader node A4 604D and the non-leader node A3 604C, and an intra-cluster connection intra-cluster connection 640F between the leader node A4 604D.

At step 512, for each of the intra-cluster network connections created at step 510, the connection manager 106 updates the connection database 108 of the initiator cluster 602 to include a representation of a connection between the new leader node of the connection and the destination node of the connection.

For example, for the intra-cluster connection 640A between non-leader node A1 604A and leader node A2 604B, the connection manager 106 can add a record that incudes the node identifier "A1" of the non-leader node A1 604A and the node identifier "A2" of the leader node A2 604B. The record representing the connection between nodes A1 and A2 is shown as row #1 of table 660, which has an initiator node ID of "A1" and an Address(es) to Access Destination Cluster 666 node ID of "A2". Further, to add a record that represents the intra-cluster connection 640B between nodes A1 and A4, the connection manager 106 can update row #2, which includes the node identifier "A1", to also include the node identifier "A4" of the leader node A4 604D. The record representing the connection between nodes A1 and A2 and also representing the connection between nodes A1 and A4 is shown as row #1 of table 660, which has an initiator node ID of "A1" and an Address(es) to Access Destination Cluster 666 node IDs of "A2, A4".

At step 512, the connection manager 106 can similarly add row #3 to table 660 to represent the intra-cluster connection 640C between non-leader node A3 604C and leader node A2 604B. The connection manager 106 can update row #3 to include a representation of the intra-cluster connection 640D between non-leader node A3 604C and leader node A4 604D.

At step 512, the connection manager 106 can similarly add row #5 to table 660 to represent the intra-cluster connection 640E between non-leader node A5 604E and leader node A2 604B. The connection manager 106 can update row #5 to include a representation of the intra-cluster connection 640F between non-leader node A5 604E and leader node A4 604D.

Example Virtualization System Architectures

According to some embodiments, all or portions of any of the foregoing techniques described with respect to FIGS. 1-6B can be partitioned into one or more modules and instanced within, or as, or in conjunction with a virtualized controller in a virtual computing environment. Some example instances within various virtual computing environments are shown and discussed in further detail in FIGS. 7A-7D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

Figure 7A:
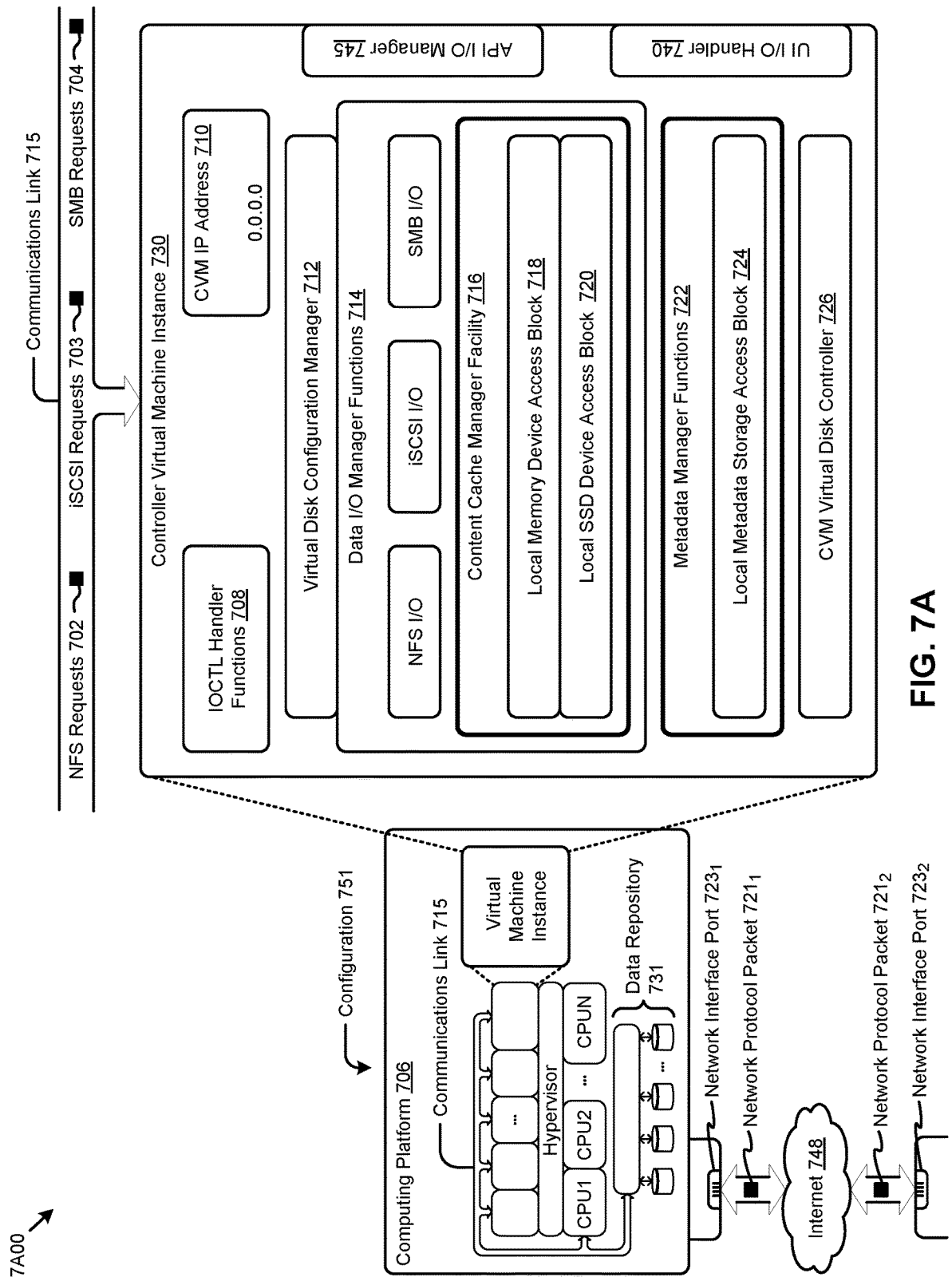
FIGS. 7A-7D are block diagrams illustrating virtualization system architectures configured to implement one or more aspects of the present embodiments.

FIG. 7A is a block diagram illustrating virtualization system architecture 7A00 configured to implement one or more aspects of the present embodiments. As shown in FIG. 7A, virtualization system architecture 7A00 includes a collection of interconnected components, including a controller virtual machine (CVM) instance 730 in a configuration 751. Configuration 751 includes a computing platform 706 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 730.

In this and other configurations, a CVM instance receives block I/O storage requests as network file system (NFS) requests in the form of NFS requests 702, internet small computer storage interface (iSCSI) block IO requests in the form of iSCSI requests 703, Samba file system (SMB) requests in the form of SMB requests 704, and/or the like. The CVM instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 706 includes one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory (RAM). As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
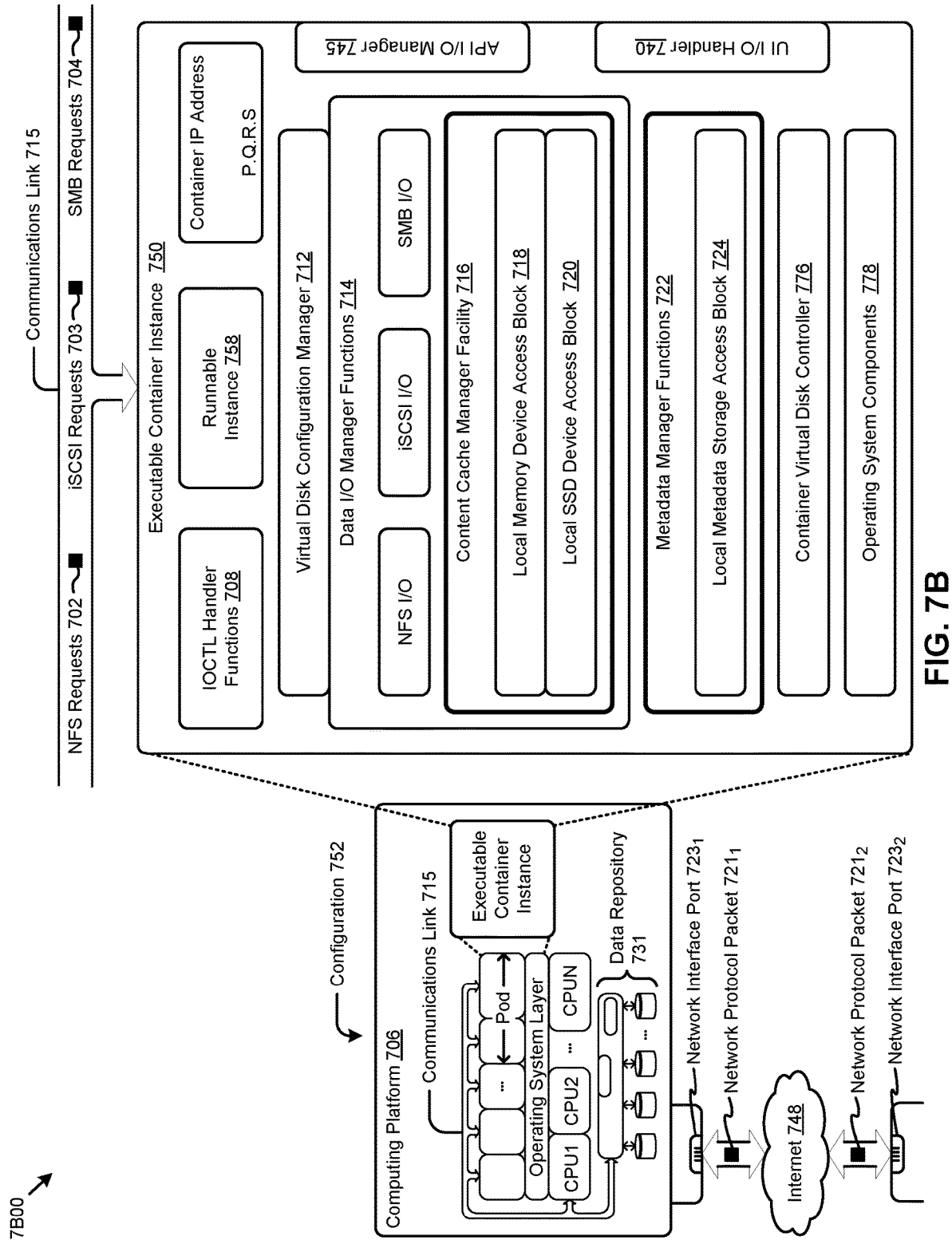

FIG. 7B depicts a block diagram illustrating another virtualization system architecture 7B00 configured to implement one or more aspects of the present embodiments. As shown in FIG. 7B, virtualization system architecture 7B00 includes a collection of interconnected components, including an executable container instance 750 in a configuration 752. Configuration 752 includes a computing platform 706 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
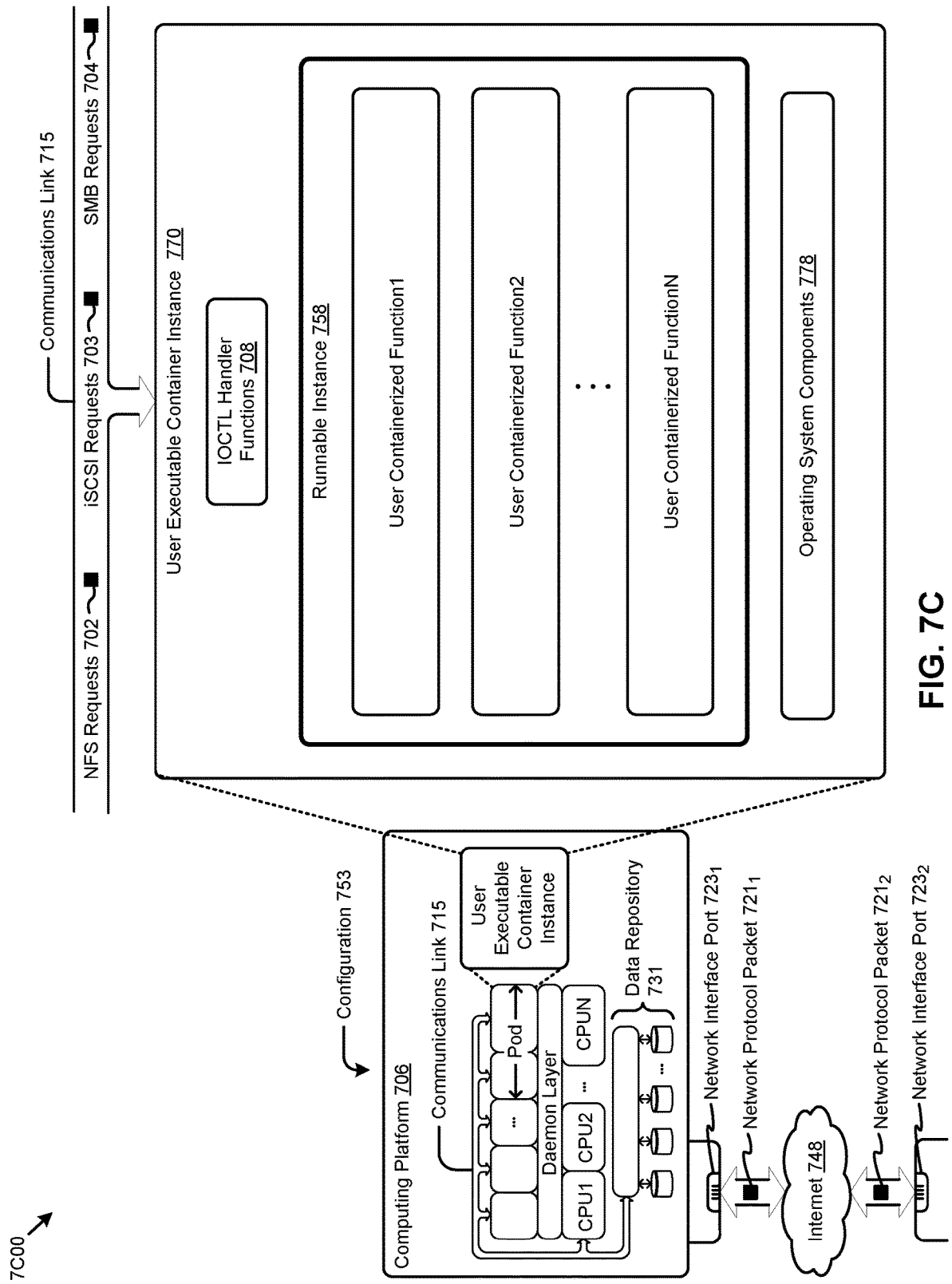

FIG. 7C is a block diagram illustrating virtualization system architecture 7C00 configured to implement one or more aspects of the present embodiments. As shown in FIG. 7C, virtualization system architecture 7C00 includes a collection of interconnected components, including a user executable container instance in configuration 753 that is further described as pertaining to user executable container instance 770. Configuration 753 includes a daemon layer (as shown) that performs certain functions of an operating system.

User executable container instance 770 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In some embodiments of a daemon-assisted containerized architecture, computing platform 706 might or might not host operating system components other than operating system components 778. More specifically, the shown daemon might or might not host operating system components other than operating system components 778 of user executable container instance 770.

In some embodiments, the virtualization system architecture 7A00, 7B00, and/or 7C00 can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (9g, as shown in configuration 751) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
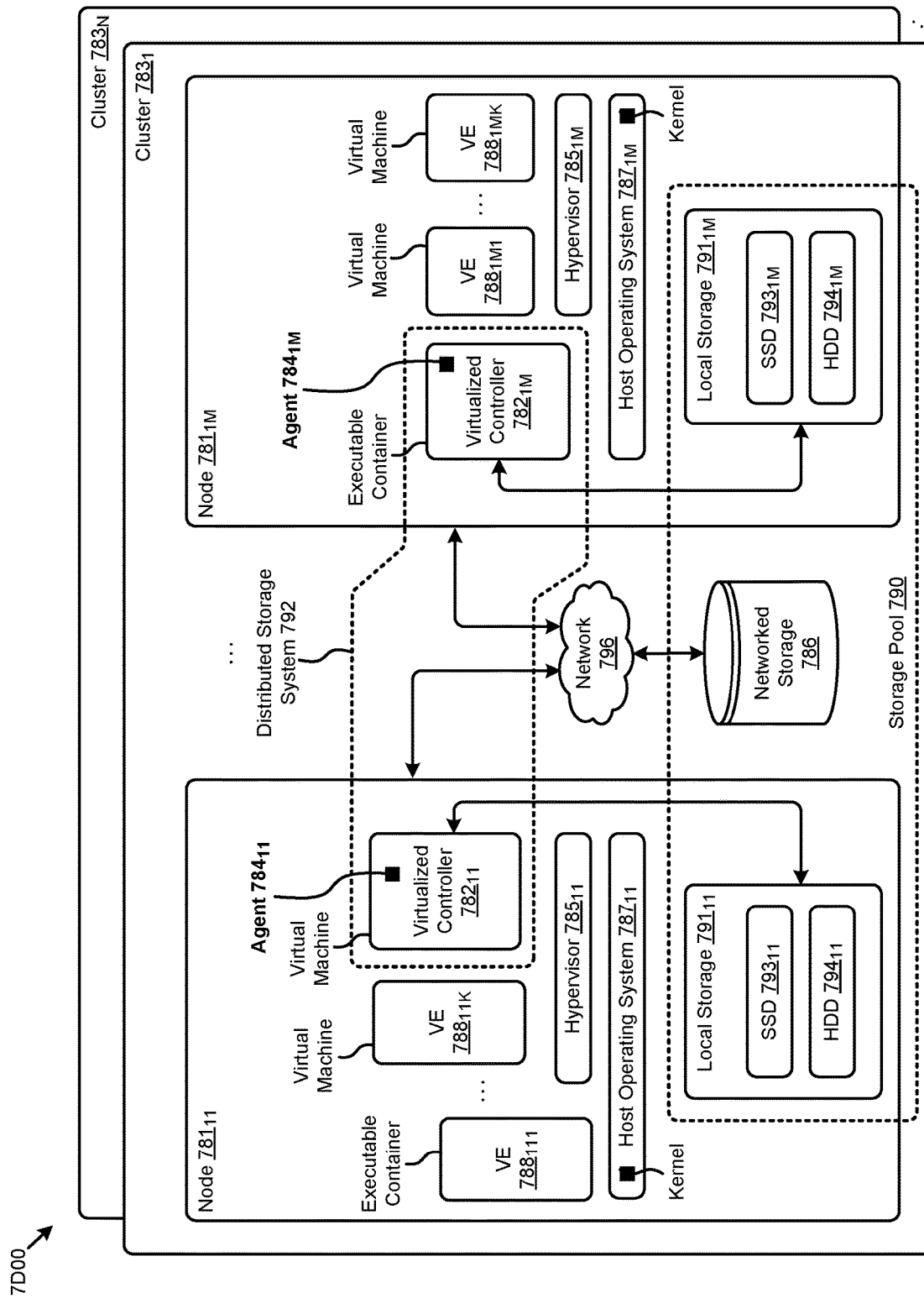

FIG. 7D is a block diagram illustrating virtualization system architecture 7D00 configured to implement one or more aspects of the present embodiments. As shown in FIG. 7D, virtualization system architecture 7D00 includes a distributed virtualization system that includes multiple clusters (e.g., cluster $783_1$, . . . , cluster $783_N$) comprising multiple nodes that have multiple tiers of storage in a storage pool. Representative nodes (e.g., node $781_{11}$, . . . , node $781_{1M}$) and storage pool 790 associated with cluster $783_1$ are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage $791_{11}$, . . . , local storage $791_{1M}$). For example, the local storage can be within or directly attached to a server and/or appliance associated with the nodes. Such local storage can include solid state drives (SSD $793_{11}$, . . . , SSD $793_{1M}$), hard disk drives (HDD $794_{11}$, . . . , HDD $794_{1M}$), and/or other storage devices.

As shown, any of the nodes of the distributed virtualization system can implement one or more user virtualized entities (e.g., VE $788_{111}$, . . . , VE $788_{11K}$, . . . , VE $788_{1M1}$, . . . , VE $788_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $787_{11}$, . . . , host operating system $787_{1M}$), while the VMs run multiple applications on various respective guest operating systems. Such flexibility can be facilitated at least in part by a hypervisor (e.g., hypervisor $785_{11}$, . . . , hypervisor $785_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $787_{11}$, . . . , host operating system $787_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 790 by the VMs and/or the executable containers.

Multiple instances of such virtualized controllers can coordinate within a cluster to form the distributed storage system 792 which can, among other operations, manage the storage pool 790. This architecture further facilitates efficient scaling in multiple dimensions (e.g., in a dimension of computing power, in a dimension of storage space, in a dimension of network bandwidth, etc.).

In some embodiments, a particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $781_{11}$ can interface with a controller virtual machine (e.g., virtualized controller $782_{11}$) through hypervisor $785_{11}$ to access data of storage pool 790. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller $782_{1M}$) in an operating system virtualization environment at a given node. In this case, for example, the virtualized entities at node $781_{1M}$ can access the storage pool 790 by interfacing with a controller container (e.g., virtualized controller $782_{1M}$) through hypervisor $785_{1M}$ and/or the kernel of host operating system $787_{1M}$.

In some embodiments, one or more instances of an agent can be implemented in the distributed storage system 792 to facilitate the herein disclosed techniques. Specifically, agent $784_{11}$ can be implemented in the virtualized controller $782_{11}$, and agent $784_{1M}$ can be implemented in the virtualized controller $782_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Example Computer System

Figure 8:
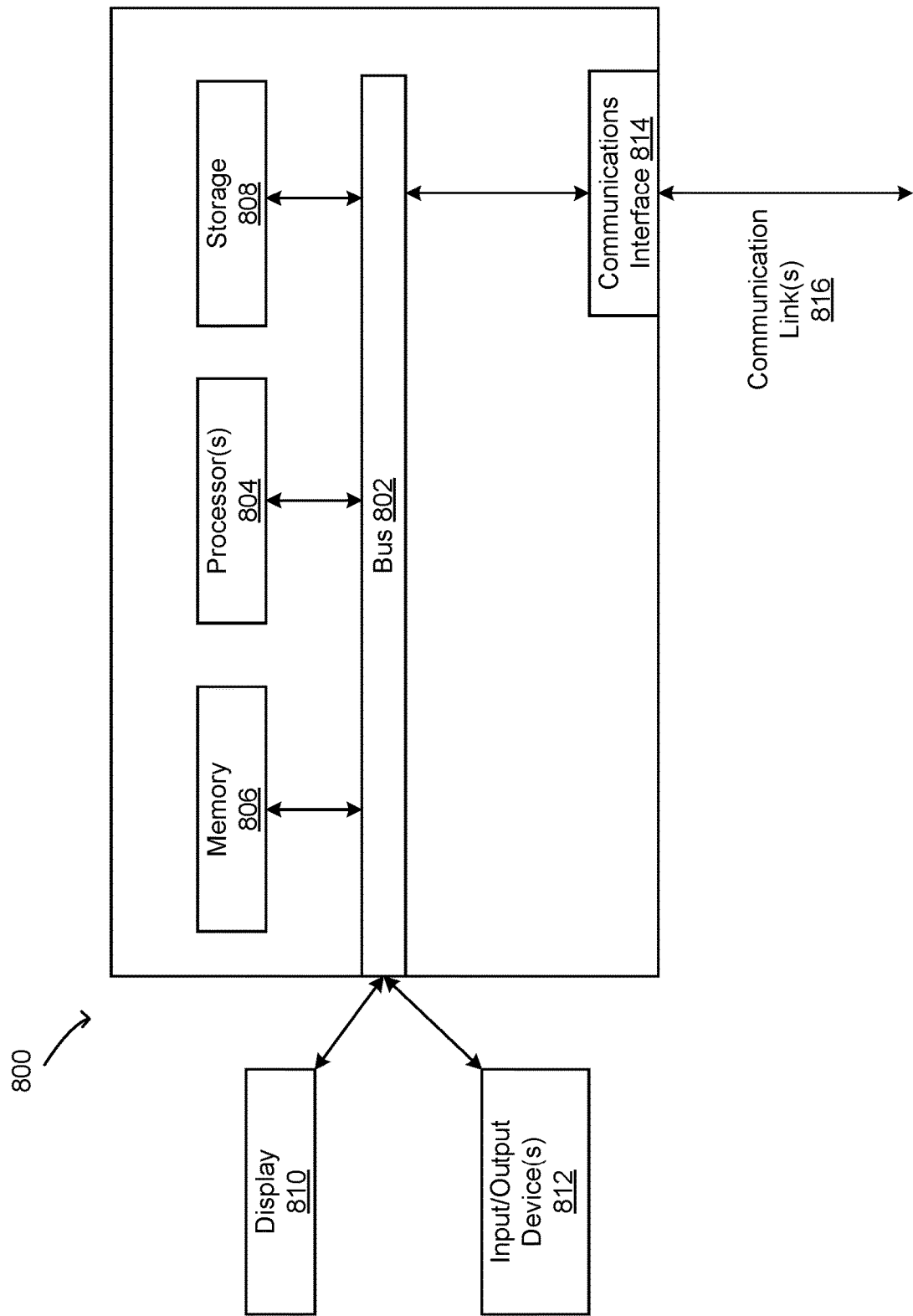
FIG. 8 is a block diagram illustrating a computer system configured to implement one or more aspects of the present embodiments.

FIG. 8 is a block diagram illustrating a computer system 800 configured to implement one or more aspects of the present embodiments. In some embodiments, computer system 800 may be representative of a computer system for implementing one or more aspects of the embodiments disclosed in FIGS. 1A-5. In some embodiments, computer system 800 is a server machine operating in a data center or a cloud computing environment suitable for implementing an embodiment of the present invention. As shown, computer system 800 includes a bus 802 or other communication mechanism for communicating information, which interconnects subsystems and devices, such as one or more processors 804, memory 806, storage 808, optional display 810, one or more input/output devices 812, and a communications interface 814. Computer system 800 described herein is illustrative and any other technically feasible configurations fall within the scope of the present disclosure.

The one or more processors 804 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 804 can be any technically feasible hardware unit capable of processing data and/or executing software applications. Further, in the context of this disclosure, the computing elements shown in computer system 800 can correspond to a physical computing system (e.g., a system in a data center) or can be a virtual computing instance, such as any of the virtual machines described in FIGS. 7A-7D.

Memory 806 includes a random-access memory (RAM) module, a flash memory unit, and/or any other type of memory unit or combination thereof. The one or more processors 804, and/or communications interface 814 are configured to read data from and write data to memory 806. Memory 806 includes various software programs that include one or more instructions that can be executed by the one or more processors 804 and application data associated with said software programs.

Storage 808 includes non-volatile storage for applications and data, and can include one or more fixed or removable disk drives, HDDs, SSD, NVMes, vDisks, flash memory devices, and/or other magnetic, optical, and/or solid-state storage devices.

Communications interface 814 includes hardware and/or software for coupling computer system 800 to one or more communication links 816. The one or more communication links 816 can include any technically feasible type of communications network that allows data to be exchanged between computer system 800 and external entities or devices, such as a web server or another networked computing system. For example, the one or more communication links 816 can include one or more wide area networks (WANs), one or more local area networks (LANs), one or more wireless (WiFi) networks, the Internet, and/or the like.

In sum, the disclosed techniques route communications between nodes of an initiator cluster and nodes of a destination cluster via one or more designated leader nodes that maintain bidirectional, inter-cluster network connections with nodes of the destination cluster. Inter-cluster communication is performed by one or more leader nodes using the inter-cluster network connections. The number of leader nodes in an initiator cluster can be determined based on an expected computational workload for the initiator cluster. A connection manager executing on each node of the initiator cluster can elect the determined number of leader nodes so that the nodes of the initiator cluster agree as to which nodes are leader nodes. The connection manager creates an inter-cluster network connection from each leader node of the initiator node to each destination node of the destination cluster. The connection manager maintains a connection database that stores a mapping from each leader node to each of the destination nodes to which the leader node has an inter-cluster network connection. Further, each node of the initiator cluster that is not a leader node is referred to herein as a non-leader node and does not have a network connection with the destination cluster. Each non-leader node has an intra-cluster network connection with each leader node of the initiator cluster. The leader nodes forward communications to the destination cluster via the inter-cluster network communications, so a non-leader node can send a communication to the destination cluster by sending the communication to a leader node. The connection manager stores a mapping from each non-leader node to each of the leader nodes to which the non-leader node has an intra-cluster network connection.

Accordingly, to send a communication from an initiator node to a destination cluster, the connection manager at the initiator node queries the connection database for a record that maps the initiator node to a target node. The target node is either a destination node in the destination cluster or a non-leader node in the initiator cluster. The connection manager can thus send a message to the destination cluster by sending the communication to the target node identified by the database query. More specifically, if the initiator node is a leader node, then the target node specified in the database is a destination node in the destination cluster. If the initiator node is a non-leader node, then the target node specified in the database is a leader node to which the initiator node can send the communication to be forwarded to a destination node in the destination cluster. The initiator node can thus send the communication to the target node returned by the database query, and the communication is delivered to the destination node in the destination cluster regardless of whether the initiator node is a leader node or a non-leader node. Communications in the reverse direction, from a destination node to a target node of the initiator cluster, can be sent via the inter-cluster connection to the leader node of the initiator cluster. The leader node can process the communication, if appropriate, or forward the communication to the target node of the initiator cluster via an intra-cluster connection.

One technical advantage of the disclosed techniques relative to the prior art is that the number of network connections between clusters is reduced, so fewer resources are used. In the disclosed techniques, the number of inter-cluster network connections initiated by a cluster is based on the number of leader nodes in the cluster. The number of leader nodes can be set to a number that is relatively small compared to the number of connections that would be used if each node of the initiator cluster establishes a connection with each node of the destination cluster, as in prior approaches. In prior approaches, over time, as a node in one cluster communicates with each node in the other cluster, the node would establish a connection with each node in the other cluster. The number of connections in such prior approaches would increase based on the product of the number of connected nodes in the initiator cluster and the number of connected nodes in the destination cluster, where each connected node is connected to a node of another cluster. Opening an inter-cluster connection for each pair of nodes is a large resource drain on the distributed system and is not scalable. The disclosed techniques open an inter-cluster connection for each leader node and so use a substantially smaller number of simultaneous open connections over time than prior approaches. Accordingly, the disclosed techniques use substantially less memory and exhibit greater scalability over time than prior approaches over time. These technical advantages provide one or more technological advancements over prior art approaches.

1. In some embodiments, one or more non-transitory computer-readable media store program instructions that, when executed by one or more processors, cause the one or more processors to perform steps of: establishing, by a first node of a first cluster, a respective first connection with each of a plurality of second nodes in a second cluster; establishing, by third node of the first cluster, a second connection with the first node, wherein the third node is prevented from establishing a connection with any of the plurality of second nodes; and sending, by the third node, a message to the second cluster by sending the message to the first node via the second connection, wherein the first node is configured to forward the message to one of the second nodes via a corresponding one of the respective first connections.
2. The one or more non-transitory computer-readable media of clause 1, wherein the first node is a leader node that establishes the respective first connection with each of the plurality of second nodes in response to being elected as a leader in the first cluster.
3. The one or more non-transitory computer-readable media of clause 1 or clause 2, wherein sending, by the third node, the message to the second cluster further comprises sending, by the third node, a request to a connection database for an address in the second cluster, wherein a response to the request includes an identifier of the first node.
4. The one or more non-transitory computer-readable media of any of clauses 1-3, wherein the identifier of the first node is included in the response based on a determination that the third node is a non-leader node of the first cluster.
5. The one or more non-transitory computer-readable media of any of clauses 1-4, wherein sending, by the third node, the message to the second cluster further comprises: sending, by the third node, a request to a connection database for an address in the second cluster, wherein a response to the request includes respective identifiers of nodes in the first cluster; and selecting the identifier of the first node from the respective identifiers.
6. The one or more non-transitory computer-readable media of any of clauses 1-5, wherein the steps further comprise sending, by the first node, the message to the second cluster, wherein sending, by the first node, the message to the second cluster comprises sending, by the first node, a request to a connection database for an address in the second cluster, wherein a response to the request includes identifiers of the second nodes.
7. The one or more non-transitory computer-readable media of any of clauses 1-6, wherein the identifier of the second node is included in the response based on a determination that the first node is a leader node of the first cluster.
8. The one or more non-transitory computer-readable media of any of clauses 1-7, wherein the steps further comprise sending, by the first node, the message to the second cluster, wherein sending, by the first node, the message to the second cluster comprises: sending, by the first node, a request to a connection database for an address in the second cluster, wherein a response to the request includes respective identifiers of nodes in the second cluster; and selecting an identifier from the respective identifiers.
9. The one or more non-transitory computer-readable media of any of clauses 1-8, wherein the steps further comprise: receiving, by the first node, a second message from one of the second nodes via the corresponding one of the respective first connections; and sending, by the first node, the second message to the third node via the second connection.
10. The one or more non-transitory computer-readable media of any of clauses 1-9, wherein the cluster of nodes is included in a public cloud computing system, a private cloud computing system, or a hybrid cloud computing system.
11. The one or more non-transitory computer-readable media of any of clauses 1-10, wherein the corresponding first connections and the second connection are TCP connections.
12. The one or more non-transitory computer-readable media of any of clauses 1-11, wherein the second nodes can send messages to the first cluster via the corresponding first connections.
13. The one or more non-transitory computer-readable media of any of clauses 1-12, wherein a firewall prevents the second nodes from establishing connections with the first node or the third node.
14. A first cluster comprising: a first node configured to establish a respective first connection with each of a plurality of second nodes in a second cluster; and a third node configured to establish a second connection with the first node, wherein the third node is prevented from establishing a connection with any of the plurality of second nodes; wherein to send a message from the third node to the second cluster: the third node is configured to send the message to the first node via the second connection; and the first node is configured to forward the message to one of the second nodes via a corresponding one of the respective first connections.
15. The first cluster of clause 14, wherein the first node is a leader node that establishes the respective first connection with each of the plurality of second nodes in response to being elected as a leader in the first cluster.
16. The first cluster of clause 14 or cause 15, wherein to send the message from the third node to the second cluster, the third node is configured to send a request to a connection database for an address in the second cluster, wherein a response to the request includes an identifier of the first node.

17. The first cluster of any of clauses 14-16, wherein the identifier of the first node is included in the response based on a determination that the third node is a non-leader node of the first cluster.

18. The first cluster of any of clauses 14-17, wherein to send the message from the third node to the second cluster, the third node is configured to: send a request to a connection database for an address in the second cluster, wherein a response to the request includes respective identifiers of nodes in the first cluster; and select the identifier of the first node from the respective identifiers.

19. The first cluster of any of clauses 14-18, wherein to send the message from the first node to the second cluster, the first node is configured to send a request to a connection database for an address in the second cluster, wherein a response to the request includes identifiers of the second nodes.

20. The first cluster of any of clauses 14-19, wherein the identifier of the second node is included in the response based on a determination that the first node is a leader node of the first cluster.

21. The first cluster of any of clauses 14-20, wherein to send the message from the first node to the second cluster, the first node is configured to: send a request to a connection database for an address in the second cluster, wherein a response to the request includes respective identifiers of nodes in the second cluster; and select an identifier from the respective identifiers.

22. The first cluster of any of clauses 14-21, wherein the first node is configured to: receive a second message from one of the second nodes via the corresponding one of the respective first connections; and send the second message to the third node via the second connection.

23. The first cluster of any of clauses 14-22, wherein the cluster of nodes is included in a public cloud computing system, a private cloud computing system, or a hybrid cloud computing system.

24. The first cluster of any of clauses 14-23, wherein the corresponding first connections and the second connection are TCP connections.

25. The first cluster of any of clauses 14-24, wherein the second nodes can send messages to the first cluster via the corresponding first connections.

26. The first cluster of any of clauses 14-25, wherein a firewall prevents the second nodes from establishing connections with the first node or the third node.

27. A computer-implemented method comprising: establishing, by a first node of a first cluster, a respective first connection with each of a plurality of second nodes in a second cluster; establishing, by third node of a computing cluster, a second connection with the first node, wherein the third node is prevented from establishing a connection with any of the plurality of second nodes; and sending, by the third node, a message to the second cluster by sending the message to the first node via the second connection, wherein the first node is configured to forward the message to one of the second nodes via a corresponding one of the respective first connections.

28. The computer-implemented method of clause 27, wherein the first node is a leader node that establishes the respective first connection with each of the plurality of second nodes in response to being elected as a leader in the first cluster.

29. The computer-implemented method of clause 27 or clause 28, wherein sending, by the third node, the message to the second cluster further comprises sending, by the third node, a request to a connection database for an address in the second cluster, wherein a response to the request includes an identifier of the first node.

30. The computer-implemented method of any of clauses 27-29, wherein the identifier of the first node is included in the response based on a determination that the third node is a non-leader node of the first cluster.

31. The computer-implemented method of any of clauses 27-30, wherein sending, by the third node, the message to the second cluster further comprises: sending, by the third node, a request to a connection database for an address in the second cluster, wherein a response to the request includes respective identifiers of nodes in the first cluster; and selecting the identifier of the first node from the respective identifiers.

32. The computer-implemented method of any of clauses 27-31, further comprising sending, by the first node, the message to the second cluster, wherein sending, by the first node, the message to the second cluster comprises sending, by the first node, a request to a connection database for an address in the second cluster, wherein a response to the request includes identifiers of the second nodes.

33. The computer-implemented method of any of clauses 27-32, wherein the identifier of the second node is included in the response based on a determination that the first node is a leader node of the first cluster.

34. The computer-implemented method of any of clauses 27-33, further comprising: sending, by the first node, the message to the second cluster, wherein sending, by the first node, the message to the second cluster comprises: sending, by the first node, a request to a connection database for an address in the second cluster, wherein a response to the request includes respective identifiers of nodes in the second cluster; and selecting an identifier from the respective identifiers.

35. The computer-implemented method of any of clauses 27-34, further comprising: receiving, by the first node, a second message from one of the second nodes via the corresponding one of the respective first connections; and sending, by the first node, the second message to the third node via the second connection.

36. The computer-implemented method of any of clauses 27-35, wherein the cluster of nodes is included in a public cloud computing system, a private cloud computing system, or a hybrid cloud computing system.

37. The computer-implemented method of any of clauses 27-36, wherein the corresponding first connections and the second connection are TCP connections.

38. The computer-implemented method of any of clauses 27-37, wherein the second nodes can send messages to the first cluster via the corresponding first connections.

39. The computer-implemented method of any of clauses 27-38, wherein a firewall prevents the second nodes from establishing connections with the first node or the third node.

40. In some embodiments, one or more non-transitory computer-readable media storing program instructions that, when executed by one or more processors, cause the one or more processors to perform a method comprising: receiving, from a first node in a first cluster, a request for a network address of a second node in a second cluster; determining whether the first node is a leader node of the first cluster; in response to determining that the first node is a leader node of the first cluster, returning the network address of the second node in the second cluster, the first node having an established connection with the second node; and in response to determining that the first node is not a leader node of the first cluster, returning a network address of a leader node of the first cluster.

41. The one or more non-transitory computer-readable media of clause 40, wherein at a node of the first cluster includes a connection database, the connection database includes one or more records, and each record includes an initiator node address and one or more destination node addresses, wherein each destination node address is an address of a node in the second cluster or an address of a leader node in the first cluster.

42. The one or more non-transitory computer-readable media of clause 40 or clause 41, wherein the connection database includes one or more records, each record includes an initiator node type and one or more destination node addresses, wherein each destination node address is an address of a node in the second cluster or an address of a leader node in the first cluster.

43. The one or more non-transitory computer-readable media of any of clauses 40-42, wherein each destination node address in a record of the one or more records is an address of a leader node when the initiator node type of the record is a non-leader node.

44. The one or more non-transitory computer-readable media of any of clauses 40-43, wherein each destination node address in a record of the one or more records is an address of a node in the second cluster when the initiator node type of the record is a leader node.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method, or computer program product. Accordingly, aspects of the present disclosure can take the form of an entirely hardware embodiment, an entirely software embodiment (including firmware, resident software, microcode, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. One or more non-transitory computer-readable media storing program instructions that, when executed by one or more processors, cause the one or more processors to perform steps of:
    establishing, by a first node of a first cluster, a respective first connection with each of a plurality of second nodes in a second cluster;

establishing, by a third node of the first cluster, a second connection with the first node, wherein the third node is prevented from establishing a connection with any of the plurality of second nodes; and sending, by the third node, a message to the second cluster by;

receiving an address of the first node from a connection database in response to a request for an address of a node in the second cluster, and sending the message to the first node via the second connection, wherein the first node is configured to;

receive an address of one of the plurality of second nodes from the connection database in response to a request for an address of a node in the second cluster, and forward the message to one of the second nodes via a corresponding one of the respective first connections.

2. The one or more non-transitory computer-readable media of claim 1, wherein the first node is a leader node that establishes the respective first connection with each of the plurality of second nodes in response to being elected as a leader in the first cluster.

3. The one or more non-transitory computer-readable media of claim 1, wherein the response to the request from the third node includes an identifier of the first node.

4. The one or more non-transitory computer-readable media of claim 1, wherein the address of the first node is included in the response based on a determination that the third node is a non-leader node of the first cluster.

5. The one or more non-transitory computer-readable media of claim 1, wherein:

the response to the request from the third node includes respective identifiers of nodes in the first cluster; and the steps, further comprise selecting, by the third node, an identifier of the first node from the respective identifiers.

6. The one or more non-transitory computer-readable media of claim 1, wherein the response to the request from the first node includes identifiers of the second nodes.

7. The one or more non-transitory computer-readable media of claim 1, wherein the address of the one of the plurality of second nodes is included in the response based on a determination that the first node is a leader node of the first cluster.

8. The one or more non-transitory computer-readable media of claim 1, wherein the steps further comprise sending, by the first node, the message to the second cluster, wherein sending, by the first node, the message to the second cluster comprises:

sending, by the first node, a request to the connection database for an address in the second cluster, wherein a response to the request includes respective identifiers of nodes in the second cluster; and selecting an identifier from the respective identifiers.

9. The one or more non-transitory computer-readable media of claim 1, wherein the steps further comprise:

receiving, by the first node, a second message from one of the second nodes via the corresponding one of the respective first connections; and sending, by the first node, the second message to the third node via the second connection.

10. The one or more non-transitory computer-readable media of claim 1, wherein the first cluster is included in a public cloud computing system, a private cloud computing system, or a hybrid cloud computing system.

11. The one or more non-transitory computer-readable media of claim 1, wherein the corresponding first connections and the second connection are TCP connections.

12. The one or more non-transitory computer-readable media of claim 1, wherein the second nodes can send messages to the first cluster via the corresponding first connections.

13. The one or more non-transitory computer-readable media of claim 1, wherein a firewall prevents the second nodes from establishing connections with the first node or the third node.

14. A first cluster comprising one or more processors executing one or more instructions to provide:

a first node configured to establish a respective first connection with each of a plurality of second nodes in a second cluster; and a third node configured to establish a second connection with the first node, wherein the third node is prevented from establishing a connection with any of the plurality of second nodes;

wherein to send a message from the third node to the second cluster:

the third node is configured to receive an address of the first node from a connection database in response to a request for an address of a node in the second cluster;

the third node is configured to send the message to the first node via the second connection; and the first node is configured to receive an address of one of the plurality of second nodes from the connection database in response to a request for an address of a node in the second cluster and forward the message to one of the second nodes via a corresponding one of the respective first connections.

15. The first cluster of claim 14, wherein the first node is a leader node that establishes the respective first connection with each of the plurality of second nodes in response to being elected as a leader in the first cluster.

16. The first cluster of claim 14, wherein to send the message from the third node to the second cluster, the third node is configured to send a request to the connection database for an address in the second cluster, wherein the response to the request from the third node includes an identifier of the first node.

17. The first cluster of claim 14, wherein the address of the first node is included in the response based on a determination that the third node is a non-leader node of the first cluster.

18. The first cluster of claim 14, wherein:

the response to the request from the third node includes respective identifiers of nodes in the first cluster; and the third node is configured to select an identifier of the first node from the respective identifiers.

19. The first cluster of claim 14, wherein a response to the request from the first node includes identifiers of the second nodes.

20. The first cluster of claim 14, wherein the address of the one of the plurality of second nodes is included in the response based on a determination that the first node is a leader node of the first cluster.

21. The first cluster of claim 14, wherein to send the message from the first node to the second cluster, the first node is configured to:

send a request to the connection database for an address in the second cluster, wherein a response to the request includes respective identifiers of nodes in the second cluster; and select an identifier from the respective identifiers.

22. The first cluster of claim 14, wherein the first node is configured to:

receive a second message from one of the second nodes via the corresponding one of the respective first connections; and send the second message to the third node via the second connection.

23. The first cluster of claim 14, wherein the cluster of nodes is included in a public cloud computing system, a private cloud computing system, or a hybrid cloud computing system.

24. The first cluster of claim 14, wherein the corresponding first connections and the second connection are TCP connections.

25. The first cluster of claim 14, wherein the second nodes can send messages to the first cluster via the corresponding first connections.

26. The first cluster of claim 14, wherein a firewall prevents the second nodes from establishing connections with the first node or the third node.

27. A computer-implemented method comprising:

establishing, by a first node of a first cluster, a respective first connection with each of a plurality of second nodes in a second cluster; and establishing, by a third node of a computing cluster, a second connection with the first node, wherein the third node is prevented from establishing a connection with any of the plurality of second nodes; and sending, by the third node, a message to the second cluster by:

receiving an address of the first node from a connection database in response to a request for an address of a node in the second cluster, and sending the message to the first node via the second connection, wherein the first node is configured to:

receive an address of one of the plurality of second nodes from the connection database in response to a request for an address of a node in the second cluster, and forward the message to one of the second nodes via a corresponding one of the respective first connections.

28. The computer-implemented method of claim 27, wherein the first node is a leader node that establishes the respective first connection with each of the plurality of second nodes in response to being elected as a leader in the first cluster.

29. The computer-implemented method of claim 27, wherein the response to the request from the third node includes an identifier of the first node.

30. The computer-implemented method of claim 27, wherein the address of the first node is included in the response based on a determination that the third node is a non-leader node of the first cluster.

31. The computer-implemented method of claim 27, wherein:

the response to the request from the third node includes respective identifiers of nodes in the first cluster; and the steps, further comprise selecting, by the third node, an identifier of the first node from the respective identifiers.

32. The computer-implemented method of claim 27, wherein the response to the request from the first node includes identifiers of the second nodes.

33. The computer-implemented method of claim 27, wherein the address of the one of the plurality of second nodes is included in the response based on a determination that the first node is a leader node of the first cluster.

34. The computer-implemented method of claim 27, further comprising: sending, by the first node, the message to the second cluster, wherein sending, by the first node, the message to the second cluster comprises:

sending, by the first node, a request to the connection database for an address in the second cluster, wherein a response to the request includes respective identifiers of nodes in the second cluster; and selecting an identifier from the respective identifiers.

35. The computer-implemented method of claim 27, further comprising:

receiving, by the first node, a second message from one of the second nodes via the corresponding one of the respective first connections; and sending, by the first node, the second message to the third node via the second connection.

36. The computer-implemented method of claim 27, wherein the first cluster is included in a public cloud computing system, a private cloud computing system, or a hybrid cloud computing system.

37. The computer-implemented method of claim 27, wherein the corresponding first connections and the second connection are TCP connections.

38. The computer-implemented method of claim 27, wherein the second nodes can send messages to the first cluster via the corresponding first connections.

39. The computer-implemented method of claim 27, wherein a firewall prevents the second nodes from establishing connections with the first node or the third node.

* * * * *